US011863856B2

(12) United States Patent
She et al.

(10) Patent No.: US 11,863,856 B2
(45) Date of Patent: Jan. 2, 2024

(54) METHOD AND TERMINAL DEVICE FOR MATCHING PHOTOGRAPHED OBJECTS AND PRESET TEXT INFORMATION

(71) Applicant: Huawei Technologies Co., Ltd., Shenzhen (CN)

(72) Inventors: Zhi She, Wuhan (CN); Bin Liu, Wuhan (CN); Huawei Ju, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/898,186

(22) Filed: Aug. 29, 2022

(65) Prior Publication Data

US 2023/0066116 A1   Mar. 2, 2023

Related U.S. Application Data

(63) Continuation of application No. 17/047,653, filed as application No. PCT/CN2019/084704 on Apr. 28, 2019, now Pat. No. 11,470,240.

(30) Foreign Application Priority Data

Apr. 28, 2018   (WO) ................ PCT/CN2018/085184

(51) Int. Cl.
*H04N 23/61*   (2023.01)
*H04N 23/65*   (2023.01)
*H04N 23/63*   (2023.01)

(52) U.S. Cl.
CPC ........... *H04N 23/61* (2023.01); *H04N 23/632* (2023.01); *H04N 23/65* (2023.01)

(58) Field of Classification Search
CPC ....... H04N 23/61; H04N 23/632; H04N 23/65
See application file for complete search history.

(56) References Cited

U.S. PATENT DOCUMENTS

2003/0039410 A1* 2/2003 Beeman ................ G06F 16/532
707/E17.03
2009/0089822 A1   4/2009 Wada
(Continued)

FOREIGN PATENT DOCUMENTS

CN   101753716 A   6/2010
CN   103050025 A   4/2013
(Continued)

*Primary Examiner* — Usman A Khan
(74) *Attorney, Agent, or Firm* — Slater Matsil, LLP

(57) ABSTRACT

A photographing method and a terminal device are disclosed. The method includes: receiving, by a terminal device, a first operation; starting, by the terminal device, a camera in response to the first operation; displaying, by the terminal device, a first preview screen including a first preview image, where the first preview image includes at least one photographed object, and the at least one photographed object in the first preview image matches preset first text information; and outputting, by the terminal device, first prompt information based on the first preview image and the first text information, where the first prompt information is used to indicate a missing or redundant photographed object in the first preview image. Indicated by the prompt information, a user can move a position or an angle of the terminal device.

17 Claims, 18 Drawing Sheets

(56) References Cited

U.S. PATENT DOCUMENTS

| | | | |
|---|---|---|---|
| 2009/0125136 A1* | 5/2009 | Akiyama | H04N 23/633 348/E9.002 |
| 2013/0242136 A1 | 9/2013 | Chen | |
| 2014/0192230 A1* | 7/2014 | Chang | H04N 1/32101 348/231.4 |
| 2015/0350571 A1 | 12/2015 | Wang | |
| 2016/0054895 A1* | 2/2016 | Lee | G06V 40/176 715/716 |
| 2016/0342834 A1 | 11/2016 | Ragnet et al. | |
| 2017/0026539 A1* | 1/2017 | Chang | H04N 1/32101 |
| 2017/0221244 A1 | 8/2017 | Hiraga et al. | |
| 2017/0315772 A1 | 11/2017 | Lee et al. | |
| 2017/0366744 A1 | 12/2017 | Cudak et al. | |
| 2020/0329211 A1* | 10/2020 | Jeong | H04N 1/32128 |

FOREIGN PATENT DOCUMENTS

| | | |
|---|---|---|
| CN | 103900712 A | 7/2014 |
| CN | 104199876 A | 12/2014 |
| CN | 104486552 A | 4/2015 |
| CN | 105159958 A | 12/2015 |
| CN | 105159988 A | 12/2015 |
| CN | 105869198 A | 8/2016 |
| CN | 106055708 A | 10/2016 |
| CN | 107135351 A | 9/2017 |
| CN | 107562952 A | 1/2018 |
| CN | 107820013 A | 4/2018 |
| CN | 107943842 A | 4/2018 |
| JP | 2010257215 A | 11/2010 |
| JP | 2012094979 A | 5/2012 |
| JP | 2013229680 A | 11/2013 |

\* cited by examiner

METHOD AND TERMINAL DEVICE FOR MATCHING PHOTOGRAPHED OBJECTS AND PRESET TEXT INFORMATION

CROSS-REFERENCE TO RELATED APPLICATIONS

This application is a continuation of U.S. patent application Ser. No. 17/047,653, filed on Oct. 14, 2020, which is a national stage application of International Application No. PCT/CN2019/084704, filed on Apr. 28, 2019. The International Application claims priority to International Application No. PCT/CN2018/085184, filed on Apr. 28, 2018. All of the aforementioned patent applications are hereby incorporated by reference in their entireties.

TECHNICAL FIELD

This application relates to the field of image photographing technologies, and in particular, to a photographing method and a terminal device.

BACKGROUND

As communications technologies develop, various functions of a terminal device are continuously improved. A photographing function of the terminal device has become one of functions that are frequently used by a user.

For example, during traveling, the user is desirous of photographing a comparatively high-quality image of a beautiful landscape for good memories. However, most users are not professional photographers or photography enthusiasts. They do not grasp a photographing technique, and do not know how to photograph a favorable photo. As a result, a photographed photo is poor and dull, which affects user's mood and reduces user experience.

SUMMARY

Embodiments of this application provide a photographing method and a terminal device, to instruct a user to photograph a comparatively high-quality image, and improve user experience.

According to a first aspect, an embodiment of the present invention provides a photographing method, and the method is applicable to a terminal device having an image photographing function. The method includes: receiving, by the terminal device, a first operation; starting, by the terminal device, a camera in response to the first operation; displaying, by the terminal device, a first preview screen including a first preview image, where the first preview image includes at least one photographed object, and the at least one photographed object in the first preview image matches preset first text information; and outputting, by the terminal device, first prompt information based on the first preview image and the first text information, where the first prompt information is used to indicate a missing or redundant photographed object in the first preview image.

In this embodiment of this application, the preview image includes the at least one photographed object, and the terminal device outputs the prompt information based on the preview image and the text information that matches the preview image, to indicate the missing or redundant photographed object in the preview image to a user. Indicated by the prompt information, the user can move a position or an angle of the terminal device, so that the missing photographed object is photographed as much as possible, and the redundant photographed object is not photographed, to achieve a better photographing effect. This manner can instruct the user to photograph a comparatively high-quality image, to help improve user experience.

In a possible design, after the terminal device outputs the first prompt information, the terminal device receives a second operation; in response to the second operation, the terminal device displays a second preview screen including a second preview image, where the second preview image is different from the first preview image, the second preview image includes at least one photographed object, and the at least one photographed object in the second preview image matches preset second text information; and the terminal device outputs second prompt information based on the second preview image and the second text information, where the second prompt information is different from the first prompt information, and the second prompt information is used to indicate a missing or redundant photographed object in the second preview image.

In this embodiment of this application, when the position of the terminal device is moved or a focal length is changed, the preview image dynamically changes. When the preview image changes, the prompt information output by the terminal device also changes. In other words, the terminal device may indicate in real time, the missing or redundant photographed object in the current preview image to the user. In this manner, the terminal device can instruct the user to move the position or the angle of the terminal device, so that the missing photographed object is photographed, and the redundant photographed object is not photographed, to achieve the better photographing effect. This manner can instruct the user to photograph the comparatively high-quality image, to help improve user experience.

In a possible design, a preview image includes M photographed objects, the preview image is the first preview image or the second preview image, and if N photographed objects in the M photographed objects match preset text information, the redundant photographed object is remaining (M−N) photographed objects obtained after the N photographed objects are removed from the M photographed objects, or if text information that matches the M photographed objects includes a keyword corresponding to another photographed object other than the M photographed objects, the another photographed object is the missing photographed object, where N≥1, and N<M. In other words, the redundant photographed object in the first preview image is a photographed object included in the first preview image but not included in the first text information; and the missing photographed object in the first preview image is a photographed object included in the first text information but not included in the first preview image; or the redundant photographed object in the second preview image is a photographed object included in the second preview image but not included in the second text information; and the missing photographed object in the second preview image is a photographed object included in the second text information but not included in the second preview image.

In this embodiment of this application, the terminal device matches appropriate text information based on the M photographed objects in the preview image. If the N photographed objects in the M photographed objects match the text information, the remaining (M−N) photographed objects are the redundant photographed object. When the text information is matched based on the M photographed objects, if the matched text information further includes the another object other than the M photographed objects, the another object is the missing photographed object. In this manner, the terminal device can instruct the user to move the position or the angle of the terminal device, so that the missing photographed object is photographed, and the redundant photographed object is not photographed, to achieve the better photographing effect. This manner can instruct the user to photograph the comparatively high-quality image, to help improve user experience.

In a possible design, the first prompt information is displayed on the first preview screen; and the second prompt information is displayed on the second preview screen. In this embodiment of this application, the prompt information may be displayed on the preview screen, to help instruct the user. Certainly, the prompt information may also be voice information. In other words, the user is instructed by using a voice.

In a possible design, the terminal device further outputs matched first text information based on the first preview image, and the first text information is displayed on the first preview screen. In this embodiment of this application, after the text information is matched based on the photographed object in the preview image, the terminal device may display the text information, to help the user view the text information.

In a possible design, the terminal device further outputs matched second text information based on the second preview image, and the second text information is displayed on the second preview screen. In this embodiment of this application, when the position of the terminal device is moved or the focal length is changed, the preview image changes. Therefore, the matched text information also changes. Therefore, when the preview image dynamically changes, the text information displayed on the terminal device also dynamically changes.

In a possible design, the first text information includes at least one piece of text information; or the second text information includes at least one piece of text information. In this embodiment of this application, there may be at least one type of the text information matched by the terminal device based on the photographed object in the preview image. If there are a plurality of types of text information, the terminal device may also display the plurality of types of text information on the preview screen.

In a possible design, the terminal device further outputs first matching degree information based on the first preview image, where the first matching degree information is used to indicate a matching degree between the first text information and the first preview image, and the first matching degree information is displayed on the first preview screen. In this embodiment of this application, after the text information is matched, the terminal device may further display the matching degree information. The user learns of the matching degree between the text information and the preview image by using the matching degree information.

In a possible design, the terminal device further outputs second matching degree information based on the second preview image, where the second matching degree information is used to indicate a matching degree between the second text information and the second preview image, and the second matching degree information is displayed on the second preview screen. In this embodiment of this application, when the position of the terminal device is moved or the focal length is changed, the preview image changes, and the matched text information also changes. Therefore, the matching degree information between the text information and the preview image also changes. Therefore, when the preview image dynamically changes, the matching degree information output by the terminal device also dynamically changes. Therefore, the user may search for a better photographing range or angle by using the matching degree information. For example, when the user finds a photographing angle where a matching degree displayed on the preview screen is comparatively high, the user can determine that the photographing angle is comparatively good. This manner can instruct the user to photograph the comparatively high-quality image, to help improve user experience.

In a possible design, the terminal device further outputs first direction indication information based on the first preview image, where the first direction indication information is used to instruct the user to move the terminal device in an indicated first direction, and the first direction indication information is displayed on the first preview screen. In this embodiment of this application, the terminal device may further display the direction indication information, and instruct the user to move the terminal device in the direction by using the direction indication information. For example, if the terminal device determines that a bird is missing in a current preview image, the terminal device may display an upward arrow, to instruct the user to move the terminal device upward. This manner can instruct the user to photograph the comparatively high-quality image, to help improve user experience.

In a possible design, the terminal device further outputs second direction indication information based on the second preview image, where the second direction indication information is used to instruct the user to move the terminal device in an indicated second direction, and the second direction indication information is displayed on the second preview screen. In this embodiment of this application, when the position of the terminal device is moved or the focal length is changed, the preview image changes, and the matched text information also changes. Therefore, the direction indication information also changes. Therefore, when the preview image dynamically changes, the direction indication information displayed on the terminal device also dynamically changes, to instruct the user to move the terminal device in a specific direction. This manner can instruct the user to photograph the comparatively high-quality image, to help improve user experience.

In a possible design, a second control is displayed in the first preview image, and the second control is configured to trigger displaying a type of text information; the terminal device displays a first list in response to a user's operation of triggering the second control, where the first list includes at least one type of the text information; and the terminal device displays the first text information in response to a user's operation of selecting a first type, where a type of the first text information is the first type. In this embodiment of this application, the user may select the type of the text information. When the user selects a type, the terminal device may display text information of this type. In this manner, the user can select the type of the text information based on a user's preference, to help improve user experience.

In a possible design, the first preview screen includes a first photographing control, and the terminal device obtains two first photographed images in response to an operation used to trigger the first photographing control, where one of the two first photographed images includes the first text information, and the other first photographed image does not include the first text information. In this embodiment of this application, if the user triggers the photographing control, the terminal device may obtain the two images: one image does not include the text information, and the other image includes the text information.

In a possible design, the second preview screen includes a second photographing control, and the terminal device obtains two second photographed images in response to an operation used to trigger the second photographing control, where one of the two second photographed images includes the second text information, and the other second photographed image does not include the second text information. In this embodiment of this application, when the position of the terminal device is moved or the focal length is changed, the preview image changes. Therefore, the matched text information also changes. Therefore, at a position, if triggering the photographing control, the user obtains the two images: one includes the text information, and the other does not include the text information.

In a possible design, a preview image includes M photographed objects, and the preview image is the first preview image or the second preview image; when M is 1, and when the terminal device matches text information based on N photographed objects in the M photographed objects, the terminal device extracts characteristic information of the photographed object, the terminal device determines, based on a mapping relationship between characteristic information and a keyword, a keyword corresponding to the extracted characteristic information; and the terminal device determines text information including the keyword. In this embodiment of this application, when the preview image includes one photographed object, the text information matched by the terminal device includes the keyword corresponding to the photographed object.

In a possible design, a preview image includes M photographed objects, and the preview image is the first preview image or the second preview image; when M is greater than or equal to 2, and when the terminal device matches text information based on N photographed objects in the M photographed objects, the terminal device determines the N photographed objects whose weights are greater than a preset weight in the M photographed objects, where the weight is used to indicate a proportion of a display area of one photographed object to a display area of an entire preview image; the terminal device extracts characteristic information from each of the N photographed objects to obtain N pieces of characteristic information in total; the terminal device determines, based on a mapping relationship between characteristic information and a keyword, N keywords corresponding to the extracted N pieces of characteristic information; and the terminal device determines text information including the N keywords. In this embodiment of this application, when the preview image includes a plurality of photographed objects, the terminal device selects the N photographed objects from the plurality of photographed objects based on a weight of each photographed object, determines the N keywords, and then searches for the text information including the N keywords.

In a possible design, when the terminal device matches the text information based on the N photographed objects in the M photographed objects, the terminal device determines at least two types of text information based on the N photographed objects in the M photographed objects, the terminal device detects current time information/geographical location information; and the terminal device selects one type of text information from the at least two types of text information based on the time information/geographical location information; or the terminal device selects one type of text information from the at least two types of text information according to a priority policy, where the priority policy includes a priority sequence between the at least two types of text information. In this embodiment of this application, when the terminal device matches the plurality of types of text information based on the photographed object in the preview image, the terminal device may select one type of text information from the plurality of types of text information according to the priority policy or based on the time information/geographic location information.

In a possible design, if the user selects other text information other than the matched text information, the terminal device determines whether a quantity of times that the user selects the other text information exceeds a preset quantity of times; when the quantity of times that the user selects the other text information exceeds the preset quantity of times, the terminal device sets a first priority level of the other text information to a second priority level, where the second priority level is higher than the first priority level; and the terminal device updates the priority policy based on the second priority level of the other text information. In this embodiment of this application, text information displayed on the terminal device may not be text information preferred by the user. Therefore, the user may select the other text information, and the terminal device may record the quantity of times that the user selects the other text information. When the user selects the other text information for a comparatively large quantity of times, the priority level of the other text information is improved. During next photographing, the text information of this type is preferably recommended. In this manner, the terminal device may record a use habit of the user, and match text information that conforms to the use habit of the user.

In a possible design, if the text information includes a poem, before the terminal device outputs the first prompt information based on the first preview image, the terminal device further responds to a user's third operation. The terminal device displays, on the first preview screen, a setting screen for setting a poem mode, where the setting screen includes an icon of the poem mode and a first control. The terminal device enables the poem mode in response to a user's operation of triggering the first control, where the poem mode is an appropriate poem mode matched by the terminal device based on a photographed object in the first preview image. In this embodiment of this application, after the terminal device starts the camera, the user may enable the device screen for setting the poem mode, and enable the poem mode by triggering the control corresponding to the poem mode. In this manner, the user may select to enable or disable the poem mode, to help improve user experience.

In a possible design, the first preview screen includes a third control and a fourth control, the third control is configured to trigger updating of the first text information, and the fourth control is configured to trigger displaying of used text information. In this embodiment of this application, if unsatisfied with the text information matched by the terminal device, the user may trigger a control to change the text information into the other text information, and the user may also trigger another control to view the used text information.

In a possible design, the text information may include a poem, a song, a proverb, a famous quote, or an internet buzzword. In this embodiment of this application, the foregoing several types are merely examples, and the text information may further include other types of information. This is not limited in this embodiment of this application.

According to a second aspect, an embodiment of the present invention provides a photographing method, and the method is applicable to a terminal device having an image photographing function. The method includes: receiving, by the terminal device, a first operation; starting, by the terminal device, a camera in response to the first operation; displaying, by the terminal device, a first preview screen including a first preview image, where the first preview image includes at least one photographed object; and displaying, by the terminal device, a first identifier of first music on the first preview screen, where the first music is music matched by the terminal device based on the at least one photographed object in the first preview image, and the first identifier is text or an icon. In this embodiment of this application, the terminal device matches the appropriate music based on the photographed object in the preview image, and then displays the identifier of the matched music. In this manner, in a process of photographing an image, the terminal device can match the appropriate music, to improve user experience.

In a possible design, after the terminal device displays the first identifier of the first music on the first preview screen, the terminal device receives a second operation; in response to the second operation, the terminal displays a second preview screen including a second preview image, where the second preview image is different from the first preview image, and the second preview image includes at least one photographed object; and the terminal device displays a second identifier of second music on the second preview screen, where the second music is different from the first music, the second music is music matched by the terminal device based on the at least one photographed object in the second preview image, and the second identifier is text or an icon. In this embodiment of this application, when a position of the terminal device is moved or a focal length is changed, the preview image changes. Therefore, the matched music also changes. Therefore, when the preview image dynamically changes, the terminal device matches the appropriate music in real time.

In a possible design, the first preview screen includes a first photographing control, and the terminal device obtains a first photographed image in response to an operation used to trigger the first photographing control, where the first photographed image is an image obtained by the terminal device by synthesizing the first music and the first preview image. In this embodiment of this application, the terminal device may match the appropriate music based on the preview image, and may generate an audio image obtained by synthesizing the preview image and the matched music. In this manner, quality of the photographed image is improved, and interest in an image photographing process is improved to some extent.

In a possible design, the second preview screen includes a second photographing control, and the terminal device obtains a second photographed image in response to an operation used to trigger the second photographing control, where the second photographed image is an image obtained by the terminal device by synthesizing the second music and the second preview image. In this embodiment of this application, when the position of the terminal device is moved or the focal length is changed, the preview image changes. Therefore, the matched music also changes. Therefore, when the preview image dynamically changes, the terminal device matches the appropriate music in real time. When the terminal device is moved to a position, if the user triggers the photographing control, the terminal device may match the appropriate music based on the preview image, and may generate the audio image obtained by synthesizing the preview image and the matched music. In this manner, the quality of the photographed image is improved, and the interest in the image photographing process is improved to some extent.

In a possible design, before the terminal device displays the first identifier of the first music, in response to a user's operation, the terminal device displays, on the first preview screen, a setting screen for setting a music mode, where the setting screen includes an icon of the music mode and a first control; and the terminal enables the music mode in response to a user's operation of triggering the first control, where the music mode is an appropriate music mode matched by the terminal device based on a photographed object in the first preview image. In this embodiment of this application, the user may select to enable or disable the music mode based on a user's preference, to help improve user experience.

In a possible design, a preview image includes M photographed objects, and the preview image is the first preview image or the second preview image; when M is 1, and when the terminal device matches music based on the at least one photographed object in the preview image, the terminal device extracts characteristic information of the photographed object; the terminal device determines, based on a mapping relationship between characteristic information and a keyword, a keyword corresponding to the extracted characteristic information; and the terminal device determines music whose lyrics include the keyword or whose name includes the keyword. In this embodiment of this application, when the preview image includes one photographed object, the lyrics or the name of the music matched by the terminal device include or includes the keyword corresponding to the photographed object.

In a possible design, a preview image includes M photographed objects, and the preview image is the first preview image or the second preview image; when M is greater than or equal to 2, and when the terminal device matches the music based on the at least one photographed object in the preview image, the terminal device determines the N photographed objects whose weight is greater than a preset weight in the M photographed objects, where the weight is used to indicate a proportion of a display area of one photographed object to a display area of an entire preview image; the terminal device extracts characteristic information from each of the N photographed objects to obtain N pieces of characteristic information in total; the terminal device determines, based on a mapping relationship between characteristic information and a keyword, N keywords corresponding to the extracted N pieces of characteristic information; and the terminal device determines the music whose lyrics include the keyword or whose name includes the keyword. In this embodiment of this application, when the preview image includes a plurality of photographed objects, the terminal device selects N photographed objects from the plurality of photographed objects based on a weight of each photographed object, determines the N keywords, and then searches for the music whose lyrics include the N keywords or whose name includes the N keywords.

In a possible design, when the terminal device matches the music based on the N photographed objects in the M photographed objects, the terminal device determines at least two types of music based on the N photographed objects in the M photographed objects, the terminal device detects current time information/geographical location information; and the terminal device selects one type of music from the at least two types of music based on the time information/geographical location information; or the terminal device selects one type of music from the at least two types of music according to a priority policy, where the priority policy includes a priority sequence between the at least two types of music. In this embodiment of this application, when the terminal device matches a plurality of pieces of music based on the photographed object in the preview image, the terminal device may select one piece of music from the plurality of pieces of music according to the priority policy or based on the time information/geographic location information.

In a possible design, if the user selects other music other than the matched music, the terminal device determines whether a quantity of times that the user selects the other music exceeds a preset quantity of times; when the quantity of times that the user selects the other music exceeds the preset quantity of times, the terminal device sets a first priority level of the other music to a second priority level, where the second priority level is higher than the first priority level; and the terminal device updates the priority policy based on the second priority level of the other music. In this embodiment of this application, the music matched by the terminal device may not be music preferred by the user. Therefore, the user may select the other music, and the terminal device may record the quantity of times that the user selects the other music. When the user selects the other music for a comparatively large quantity of times, the priority level of the other music is improved. During next photographing, this type of music is preferably recommended. In this manner, the terminal device may record a use habit of the user, and match music that conforms to the use habit of the user.

According to a third aspect, an embodiment of this application provides a terminal device, including a camera, a display screen, a processor, and a memory. The camera is configured to capture a preview image, the display screen is configured to display the preview image, and the memory is configured to store one or more computer programs. When the one or more computer programs stored on the memory are executed by the processor, the terminal device is enabled to implement the method in any one of the first aspect or the possible designs of the first aspect, or when the one or more computer programs stored on the memory are executed by the processor, the terminal device is enabled to implement the method in any one of the second aspect or the possible designs of the second aspect.

According to a fourth aspect, an embodiment of this application further provides a terminal device. The terminal device includes modules/units that perform the method in any one of the first aspect or the possible designs of the first aspect, or the terminal device includes modules/units that perform the method in any one of the second aspect or the possible designs of the second aspect. These modules/units may be implemented by hardware, or may be implemented by hardware by executing corresponding software.

According to a fifth aspect, an embodiment of this application further provides a computer-readable storage medium. The computer-readable storage medium includes a computer program. When the computer program runs on a terminal device, the terminal device is enabled to perform the method in any one of the first aspect or the possible designs of the first aspect, or when the computer program runs on a terminal device, the terminal device is enabled to perform the method in any one of the second aspect or the possible designs of the second aspect.

According to a sixth aspect, an embodiment of this application further provides a computer program product. When the computer program product runs on a terminal device, the terminal device is enabled to perform the method in any one of the first aspect or the possible designs of the first aspect, or when the computer program product runs on a terminal device, the terminal device is enabled to perform the method in any one of the second aspect or the possible designs of the second aspect.

DETAILED DESCRIPTION OF ILLUSTRATIVE EMBODIMENTS

The following describes technical solutions of embodiments in this application with reference to accompanying drawings in the embodiments of this application.

A terminal device in the embodiments of this application may also be referred to as user equipment (user equipment, UE). The terminal device may be a smartphone, a tablet computer, various wearable devices, a vehicle-mounted device, or the like. Various application programs, such as WeChat and Maps, may be installed on the terminal device.

"A plurality of" in the embodiments of this application indicates "two or more".

In addition, it should be understood that in descriptions of this application, terms such as "first" and "second" are merely used for differentiation and description, but should not be understood as an indication or implication of relative importance or an indication or implication of an order.

Figure 1:
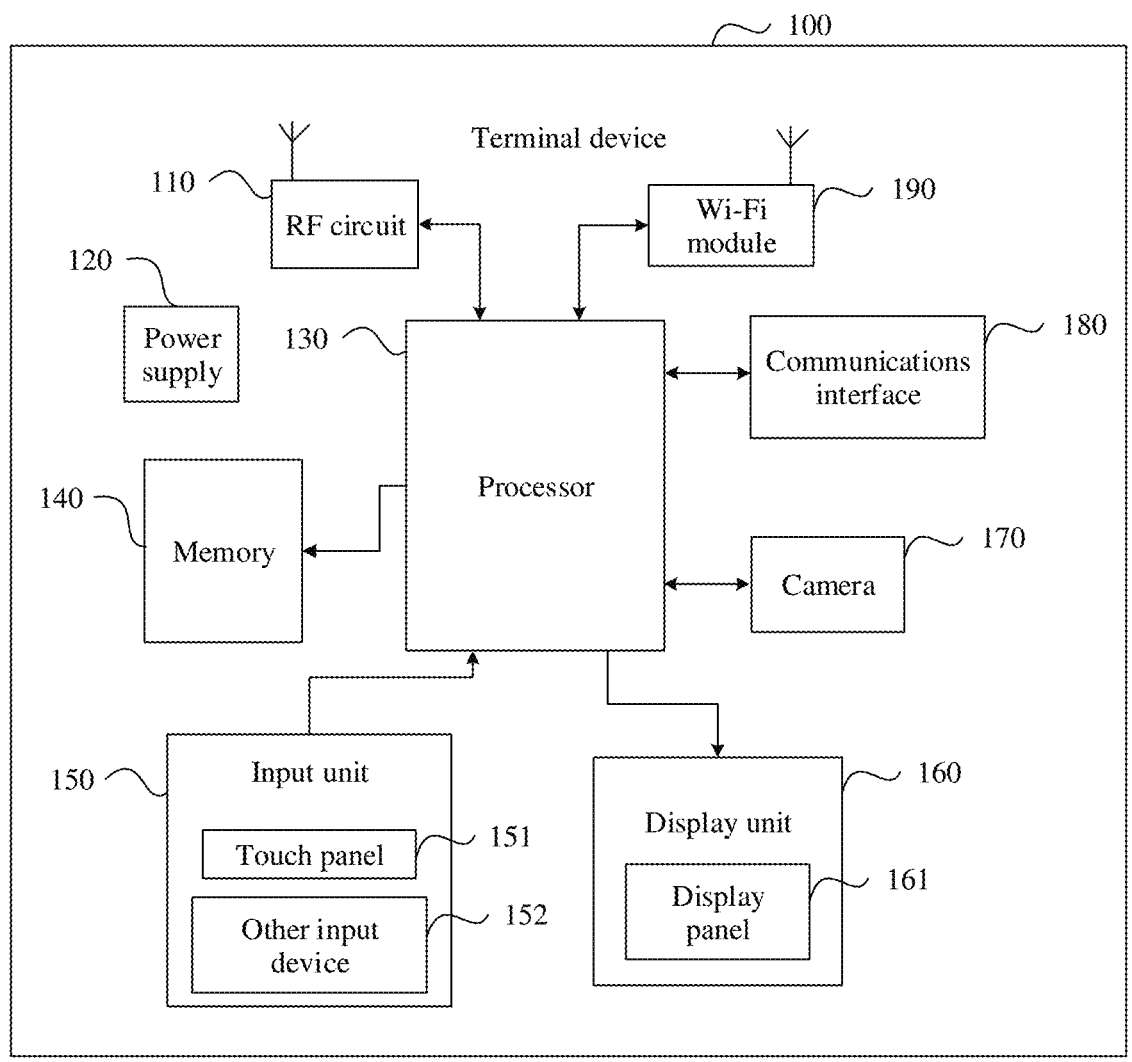
FIG. 1 is a schematic diagram of a structure of a terminal device according to an embodiment of the present invention.

The embodiments of this application provide a photographing method and a terminal device. The method is applicable to the terminal device. FIG. 1 is a structural diagram of a possible terminal device. Referring to FIG. 1, the terminal device 100 includes components such as a radio frequency (Radio Frequency, RF) circuit 110, a power supply 120, a processor 130, a memory 140, an input unit 150, a display unit 160, a camera 170, a communications interface 180, and wireless fidelity (Wireless Fidelity, Wi-Fi) module 190. It can be understood by a person skilled in the art that the structure of the terminal device shown in FIG. 1 does not constitute a limitation on the terminal device, and the terminal device provided in this embodiment of this application may include more or fewer components than those shown in the figure, combine some components, or have different component arrangements.

The following describes constituent components of the terminal device 100 in detail with reference to FIG. 1.

The RF circuit 11o may be configured to receive and send data in a communication or call process. Specifically, after receiving downlink data from a base station, the RF circuit 110 sends the downlink data to the processor 130 for processing, and sends to-be-sent uplink data to the base station. The RF circuit 11o usually includes but is not limited to an antenna, at least one amplifier, a transceiver, a coupler, a low noise amplifier (Low Noise Amplifier, LNA), a duplexer, and the like.

The RF circuit 110 may further communicate with a network and another device through radio communications. Any communications standard or protocol may be used for the radio communications, including but not limited to a global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

A Wi-Fi technology belongs to a short-range wireless transmission technology. The terminal device 100 may connect to an access point (Access Point, AP) by using the Wi-Fi module 190, so as to gain access to a data network. The Wi-Fi module 190 may be configured to receive and send the data in the communication process.

The terminal device 100 may be physically connected to the another device by using the communications interface 18o. Optionally, the communications interface 18o is connected to a communications interface of the another device by using a cable, so as to transmit the data between the terminal device 100 and the another device.

In this embodiment of this application, the terminal device 100 can implement a communication service and send information to another contact. Therefore, the terminal device 100 is required to have a data transmission function. In other words, a communications module needs to be included in the terminal 100. Although FIG. 1 shows communications modules such as the RF circuit 11o, the Wi-Fi module 190, and the communications interface 180, it may be understood that the terminal device 100 includes at least one of the foregoing components or another communications module (for example, a Bluetooth module) configured to implement communication, so as to transmit the data.

For example, when the terminal device 100 is a mobile phone, the terminal device 100 may include the RF circuit 11o, and may further include the Wi-Fi module 19o; when the terminal device 100 is a computer, the terminal device 100 may include the communications interface 180, and may further include the Wi-Fi module 19o; and when the terminal device 100 is a tablet computer, the terminal device 100 may include the Wi-Fi module.

The memory 140 may be configured to store a software program and a module. The processor 130 runs the software program and the module stored on the memory 140, to execute various function applications of the terminal device 100 and processes the data.

Optionally, the memory 140 may mainly include a program storage area and a data storage area. The program storage area may store an operating system, various application programs (such as a communication application), a facial recognition module, and the like. The data storage area may store data (for example, multimedia files such as various pictures and video files, and a face information template) created based on use of the terminal device, and the like.

In addition, the memory 140 may include a high-speed random access memory, and may further include a nonvolatile memory, for example, at least one magnetic disk storage device, a flash memory device, or another volatile solid-state storage device.

The input unit 150 may be configured to receive numbers or characteristic information entered by a user, and generate key signal input related to user setting and function control of the terminal device 100.

Optionally, the input unit 150 may include a touch panel 151 and another input device 152.

The touch panel 151 is also referred to as a touchscreen, may collect a touch operation (for example, an operation of the user on the touch panel 151 or near the touch panel 151 by using any appropriate object or accessory such as a finger or a stylus) of the user on or near the touch panel 151, and drive a corresponding connection apparatus according to a preset program. Optionally, the touch panel 151 may include two parts: a touch detection apparatus and a touch controller. The touch detection apparatus detects a touch orientation of the user, detects a signal brought by a touch operation, and transfers the signal to the touch controller. The touch controller receives touch information from the touch detection apparatus, converts the touch information into contact coordinates, and sends the contact coordinates to the processor 130, and can receive and execute a command sent by the processor 130. In addition, the touch panel 151 may be, for example, a resistive, capacitive, infrared, or surface acoustic touch panel.

Optionally, the another input device 152 may include but is not limited to one or more physical keyboards, a function key (for example, a volume control button or a power on/off button), a tracking ball, a mouse, a joystick, and the like.

The display unit 160 may be configured to display information entered by the user, information provided for the user, and various menus of the terminal device 100. The display unit 160 is a display system of the terminal device 100, and is configured to present a screen to implement human-computer interaction.

The display unit 160 may include a display panel 161. Optionally, the display panel 161 may be configured in a form of a liquid crystal display (Liquid Crystal Display, LCD) screen, an organic light emitting diode (Organic Light-Emitting Diode, OLED), or the like.

Further, the touch panel 151 may cover the display panel 161. After detecting the touch operation on or near the touch panel 151, the touch panel 151 transfers information about the touch operation to the processor 130 to determine a touch event type. Subsequently, the processor 130 provides corresponding visual output on the display panel 161 based on the touch event type.

Although in FIG. 1, the touch panel 151 and the display panel 161 serve as two discrete components to implement input and input functions of the terminal device 100. However, in some embodiments, the touch panel 151 may be integrated into the display panel 161 to implement the input and output functions of the terminal device 100.

The processor 130 is a control center of the terminal device 100, connects to the components by using various interfaces and lines, and runs or executes the software program and/or the module stored on the memory 140 and invokes the data stored on the memory 140, to perform various functions of the terminal device 100 and process the data, and implement a plurality of services based on the terminal device.

Optionally, the processor 130 may include one or more processing units. Optionally, the processor 130 may integrate an application processor and a modem processor. The application processor mainly processes an operating system, a user interface, an application program, and the like. The modem processor mainly processes the radio communications. It may be understood that the modem processor may alternatively not be integrated into the processor 130.

The camera 170 is configured to implement a photographing function of the terminal device 100, to photograph a picture or a video. The camera 170 may further be configured to implement a scanning function of the terminal device 100, and scan a scanning object (a two-dimensional code/bar code).

The terminal device 100 further includes the power supply 120 (such as a battery) configured to supply power to the components. Optionally, the power supply 120 may be logically connected to the processor 130 by using a power management system, to implement functions such as charge management, discharge management, and power consumption management by using the power management system.

Although not shown, the terminal device 100 may further include at least one sensor, an audio circuit, and the like. Details are not described herein.

Figure 2:
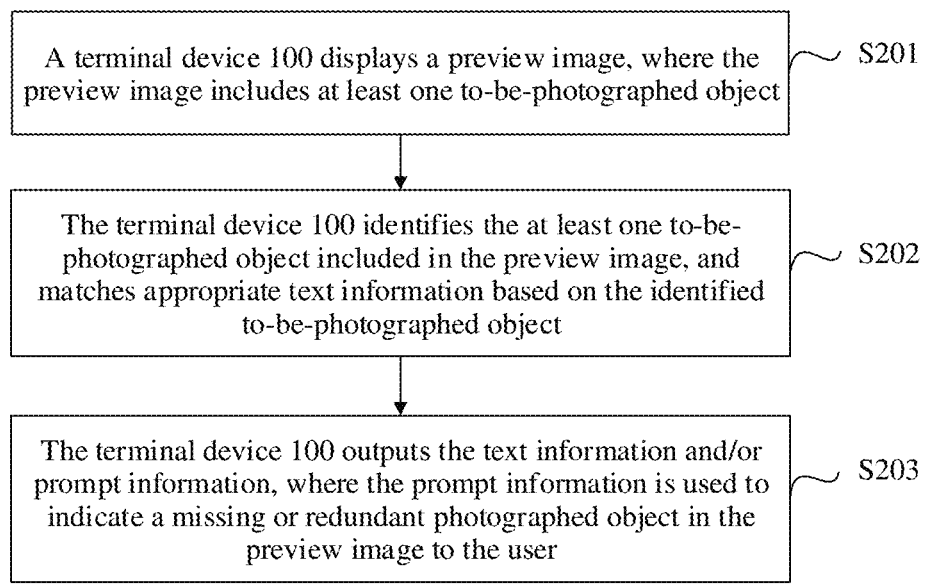
FIG. 2 is a flowchart of a photographing method according to an embodiment of the present invention.

Embodiments of this application provide a photographing method and a terminal device. In the method, a terminal device may identify a photographed object in a preview image, and recommend text information such as a poem or a song that matches the photographed object, and prompt information to a user, to indicate a missing photographed object or a redundant photographed object in the preview image to the user. The user may adjust a photographing range/angle and the like based on the prompt information, to obtain a high-quality image. In this manner, the user who does not grasp a photographing technique can also photograph the high-quality image. The photographing method provided in this embodiment of this application is applicable to the terminal device 100 shown in FIG. 1. Therefore, in the following description, the terminal device 100 is used as an example for description. Specifically, refer to FIG. 2. FIG. 2 is a flowchart of a photographing method according to an embodiment of this application. As shown in FIG. 2, a procedure of the method includes:

S201: The terminal device 100 displays a preview image, where the preview image includes at least one photographed object.

In this embodiment of this application, the terminal device 100 may start an application program having a photographing function to start a camera 170. The application program having the photographing function may be a camera application embedded in the terminal device 100, or another application program installed on the terminal device 100, for example, an application program, such as Beauty-Cam, MIX, Beauty Camera, WeChat, Alipay, Tencent chat software (QQ), Ding Talk, or photo sharing (Instagram), Kakao Talk, or LINE (Line) having the photographing function.

A camera embedded in the terminal device 100 is used as an example. When the user needs to photograph a photo, the user may trigger an icon of the camera displayed on the terminal device 100 to start the camera. A processor 130 of the terminal device 100 runs the camera, starts the camera 170, and displays the preview image on a display panel 161 of a display unit 160. When the user points the camera 170 at the photographed object, the photographed object is displayed in the preview image.

S202: The terminal device 100 identifies the at least one photographed object included in the preview image, and matches appropriate text information based on the identified photographed object, where the text information may include a poem, a song, a proverb, a famous quote, an internet buzzword, or the like.

For example, when identifying the at least one photographed object included in the preview image, the terminal device 100 may collect one or more frames of preview images, and then identify an image in the collected preview image. When collecting the preview image, the terminal device 100 may start to collect the preview image at a moment when the terminal starts the camera 170, and stop the collection until a moment when the terminal device 100 detects that the user triggers a photographing button. Alternatively, the terminal device 100 starts to collect the preview image at a moment when the terminal starts the camera 170, and stops the collection until a moment when the terminal device 100 determines that the terminal device 100 is already in a stationary state or the photographed object in the preview image is stably displayed.

After collecting the preview image, the terminal device 100 may identify the photographed object in the preview image. The photographed object may include various content, for example, a person, an animal, food, a flower, a green plant, a mountain, a river, a stage, a beach, a waterfall, a night scene, a blue sky, and a snow scene. After identifying the photographed object included in the preview image, the terminal device 100 may match, in a database, appropriate text information based on the identified photographed object. In the following description, that the text information is mainly the poem is used as an example. In an example, when matching the appropriate text information based on the identified photographed objects, the terminal device 100 may match the text information by keyword matching.

For example, after identifying the photographed object, the terminal device 100 extracts characteristic information from the photographed object, determines, based on a mapping relationship between characteristic information and keywords, keywords corresponding to the extracted characteristic information, and then matches, in the database, text information including these keywords based on the determined keyword.

For example, when the extracted characteristic information included in the photographed object is a person, the terminal device 100 obtains, based on the mapping relationship, keywords corresponding to the person. For example, the obtained keywords corresponding to the person include three keywords: "person", "her", and "he". The terminal device 100 may match, in the database, text information that includes a keyword in the three keywords. In this embodiment of this application, the mapping relationship between the characteristic information and the keywords may be stored locally or on a server. Further, the user may also modify the mapping relationship. For example, "under the pines I questioned the boy, my master's off gathering herbs" does not have the three keywords "person", "her", and "he". The user may add a keyword "boy" to the mapping relationship. To be specific, "boy" is added to the keyword corresponding to the person in the mapping relationship. In another example, keywords in all the text information stored on the terminal device or the server may be matched with the characteristic information in advance. For example, when the stored text information includes "under the pines I questioned the boy, my master's off gathering herbs", keywords such as "boy", and "master" may be matched with the characteristic information "person" in advance. In a subsequent photographing process, when the characteristic information included in the photographed object extracted by the terminal device 100 has the person, the line of poem "under the pines I questioned the boy, my master's off gathering herbs" may be matched. Alternatively, when the stored text information includes "looking up, I find the moon bright, bowing, in homesickness I'm drowned", "as the bright moon shines over the sea, from far away you share this moment with me", keywords such as "bright moon" may be matched with characteristic information "moon" in advance. In a subsequent photographing process, when the characteristic information included in the photographed object extracted by the terminal device 100 has the moon, the two lines of poems may be matched.

In another example, when matching the appropriate text information based on the identified photographed object, the terminal device 100 may use different manners based on different quantities of photographed objects.

In an actual application process, the terminal device 100 may identify at least one type of photographed object.

When identifying only one type of photographed object, the terminal device 100 searches the database for text information matching the photographed object, and then recommends the text information to the user.

When identifying the at least one type of photographed object, the terminal device 100 may combine the identified photographed objects. For example, the terminal device 100 identifies three photographed objects. It is assumed that the three photographed objects correspond to three keywords. If there is text information including the three keywords, the terminal device 100 recommends the text information to the user. If there is not the text information including the three keywords, the three keywords are combined every two to obtain three combinations. Each combination includes two keywords. Then, the terminal device 100 separately searches for whether there is text information including the two keywords of a combination. If there is the text information, the terminal device 100 recommends the text information to the user. If there is not the text information, the terminal device 100 separately matches appropriate text information based on each of the three keywords. If there is the text information including a keyword, the terminal device 100 recommends the text information to the user.

Optionally, the terminal device 100 may randomly combine the identified photographed objects, or may combine the identified photographed objects based on weights of the identified photographed objects. If the terminal device 100 combines the identified photographed objects based on the weights of the identified photographed objects, the terminal device 100 needs to evaluate a weight of each photographed object. For example, a weight may be set based on a proportion of a display area of the photographed object to a display area of an entire preview image. A larger weight of the photographed object may be set for a larger proportion of the display area of the photographed object to the display area of the entire preview image. For example, the terminal device 100 identifies three photographed objects. It is assumed that a display area of a first photographed object of the three photographed objects in the preview image is the largest, and a display area of a third photographed object is the smallest. The terminal device 100 sorts weights of the three photographed objects: a weight of the first photographed object>a weight of a second photographed object>a weight of the third photographed object. The terminal device 100 may preferably consider a combination of photographed objects with comparatively high weights. Certainly, if a proportion of the display area of the third photographed object to the area of the entire preview image is less than a preset value, the terminal device 100 may also ignore the third photographed object. Certainly, the terminal device 100 may evaluate the weight of each photographed object in a plurality of manners. For example, the terminal device 100 evaluates the weight of each photographed object based on brightness, a color saturation rate, or the like of each photographed object.

In still another example, in an actual application, there may be a plurality of types of appropriate text information matched by the terminal device 100 based on the identified photographed object. For example, one photographed object is identified, and the photographed object identified by the terminal device 100 includes the moon. The terminal device 100 can find, in the database, the plurality of types of text information matching the moon, for example, "looking up, I find the moon bright, bowing, in homesickness I'm drowned", "as the bright moon shines over the sea, from far away you share this moment with me". To recommend comparatively appropriate text information to the user, the terminal device 100 may further obtain other information, and select, based on the other information, the comparatively appropriate text information from the plurality of types of matched text information.

In a possible implementation, the terminal device 100 may detect current time or date, and select the comparatively appropriate text information from the plurality of types of text information based on the detected time (or date). The time herein may be a specific moment, or may be a time period.

For example, the terminal device 100 identifies that the photographed object in the preview image includes the sun, and the text information determined by the terminal device 100 includes two lines of poems: "the sun dips down in the west, and the lovesick traveler is still at the end of the world" "over the waves the sun glows, redder than fire, and the spring water flows, as blue as sapphire". If the terminal device 100 detects that the current time is 18:00, the terminal device 100 determines that "the sun dips down in the west, and the lovesick traveler is still at the end of the world" is a comparatively appropriate poem.

In another possible implementation, the terminal device 100 may further detect a current geographical location of the terminal device 100, and select the comparatively appropriate text information from the plurality of types of text information based on the geographical location.

For example, if the photographed object identified by the terminal device 100 in the preview image includes a flower, a grass, and a bridge, and corresponding keywords are "grass" and "bridge", the terminal device 100 searches the database for a poem including the two keywords. For example, the terminal device 100 finds two lines of poems: "beside the Bridge of Birds rank grasses overgrow, over the Street of Mansions the setting sun hangs low" and "in the water, a mountain is distant and a cloud looks like snow, and a grass near the bridge likes a smoke". If the terminal device 100 detects that the terminal device 100 is currently located at the "Street of Mansions" in Nanjing, the terminal device 100 determines that "beside the Bridge of Birds rank grasses overgrow, over the Street of Mansions the setting sun hangs low" is the comparatively appropriate poem.

In still another possible implementation, when the terminal device 100 matches the plurality of types of text information based on the photographed object, the terminal device 100 may determine one type of text information from the plurality of types of text information according to a priority policy. For example, the terminal device 100 may determine priorities of the plurality of types of text information, and recommend text information with a comparatively high priority level to the user. Optionally, priority levels between different text information may be obtained based on the use habit of the user. For example, if the user often selects "looking up, I find the moon bright, bowing, in homesickness I'm drowned", a priority level of "looking up, I find the moon bright, bowing, in homesickness I'm drowned" is higher than a priority level of "As the bright moon shines over the sea, from far away you share this moment with me". Therefore, the terminal device 100 recommends "looking up, I find the moon bright, bowing, in homesickness I'm drowned" to the user.

In this embodiment of this application, the priority level may be updated. For example, after the terminal device 100 recommends the text information to the user, the user selects to use other text information. When the terminal device 100 detects that a quantity of times that the user uses the other text information exceeds a preset quantity of times, the terminal device 100 may improve a priority of the other text information, and update the priority policy.

Certainly, in an actual application process, the terminal device 100 may search for the appropriate text information based on the time, the geographical location, the keyword of the photographed object, and other information.

In this embodiment of this application, the poem, the song, the proverb, the famous quote, the internet buzzword, or the like may be stored locally on the terminal device 100. Certainly, terminal 100 may also obtain the poem, the song, the proverb, the famous quote, the internet buzzword, or the like from a network or a server.

S203: The terminal device 100 outputs the text information and/or prompt information, where the prompt information is used to indicate a missing or redundant photographed object in the preview image to the user. For example, there are M photographed objects in the preview image of the terminal device. When the text information is matched based on these photographed objects, only N photographed objects in the M photographed objects match the appropriate text information. The redundant photographed object is remaining (M−N) photographed objects obtained after the N photographed objects are removed from the M photographed objects. In this case, the redundant photographed object may be indicated to the user. According to the indication, the user may move a position or an angle of the terminal device, so that the preview image does not include these redundant photographed objects. In other words, the redundant photographed object is not photographed, so as to achieve a better photographing effect. In another case, when the text information is matched based on the M photographed objects, if the matched text information further includes another object other than the M photographed objects, the another object is the missing photographed object. Likewise, the terminal device may indicate the missing photographed object to the user. According to the indication, the user may move the position or the angle of the terminal device, so that the missing photographed object is added to the preview image. In other words, the missing photographed object is photographed, so as to achieve the better photographing effect.

For example, it can be learned from the foregoing content that when the terminal device 100 identifies that the preview image includes the plurality of photographed objects, and the plurality of photographed objects may be combined. The text information is determined based on a combined photographed object. Therefore, some redundant photographed objects in the plurality of photographed objects in the preview image may appear. For example, the photographed objects included in the preview image have a person, a sea, and the moon. The terminal device 100 determines the poem "as the bright moon shines over the sea, from far away you share this moment with me" based on the sea and the moon, and the person is redundant. In this case, the terminal device 100 may display the prompt information, and the prompt information is used to indicate the redundant photographed object, namely, the person in the current preview image to the user.

For another example, the text information usually also includes a plurality of keywords. Therefore, the text information matched by the terminal device 100 may include a keyword, but the preview image does not include a photographed object corresponding to the keyword. Therefore, the terminal device 100 may display the prompt information, and the prompt information is used to indicate the missing photographed object corresponding to the keyword in the text information in the current preview image to the user.

In this embodiment of this application, if there is no redundant or missing photographed object in the preview image, in other words, if M keywords corresponding to the M photographed objects in the preview image match M keywords included in the text information one by one, the terminal device 100 may not display the prompt information.

In this embodiment of this application, the prompt information may be a voice message. In other words, the terminal may instruct the user by playing a voice, or the prompt information may be content that can be displayed on a display screen, such as text, an icon, or an image. The prompt information may be specifically displayed in a preview screen, to help instruct the user.

For example, the prompt information is the text. A prompt dialog box may be displayed in the preview image of the terminal device 100, and the prompt dialog box includes the text such as "add a river", "move the camera to add a river", "redundant person", or "move the camera to delete the person".

After the text information is matched, the terminal device 100 may further display matching degree information on the display screen, and the matching degree information is used to indicate a matching degree between the text information and the matched text information. The matching degree information may be displayed in a form of a number, for example, displayed as a matching degree percentage. Certainly, the matching degree information may also be displayed in another form, for example, displayed in an expression manner. When the expression is smiling, it indicates that the matching degree is comparatively high. When the expression is sad, it indicates that the matching degree is comparatively low.

In this embodiment of this application, the terminal device 100 may collect the preview image in real time, match, in the database, the appropriate text information based on the photographed object included in the collected preview image, and display the matched text information, the matching degree information, and the prompt information, to indicate the missing or redundant photographed object in the preview image to the user. The user may adjust a photographing range/angle, and the like based on the prompt information. When the position of the terminal device is moved or a focal length is changed to adjust the photographing range/angle, the preview image changes, and the terminal re-matches text information based on a photographed object in a changed preview image. If the re-matched text information changes compared with the previous text information, the matching degree information and the prompt information also correspondingly change, and the terminal may display changed matching degree information and prompt information. In other words, when the preview image dynamically changes, the text information, the matching degree information, and the prompt information also dynamically changes.

For example, FIG. 3A to FIG. 3E are schematic diagrams of display states of a display screen of a mobile phone.

Figure 3A:
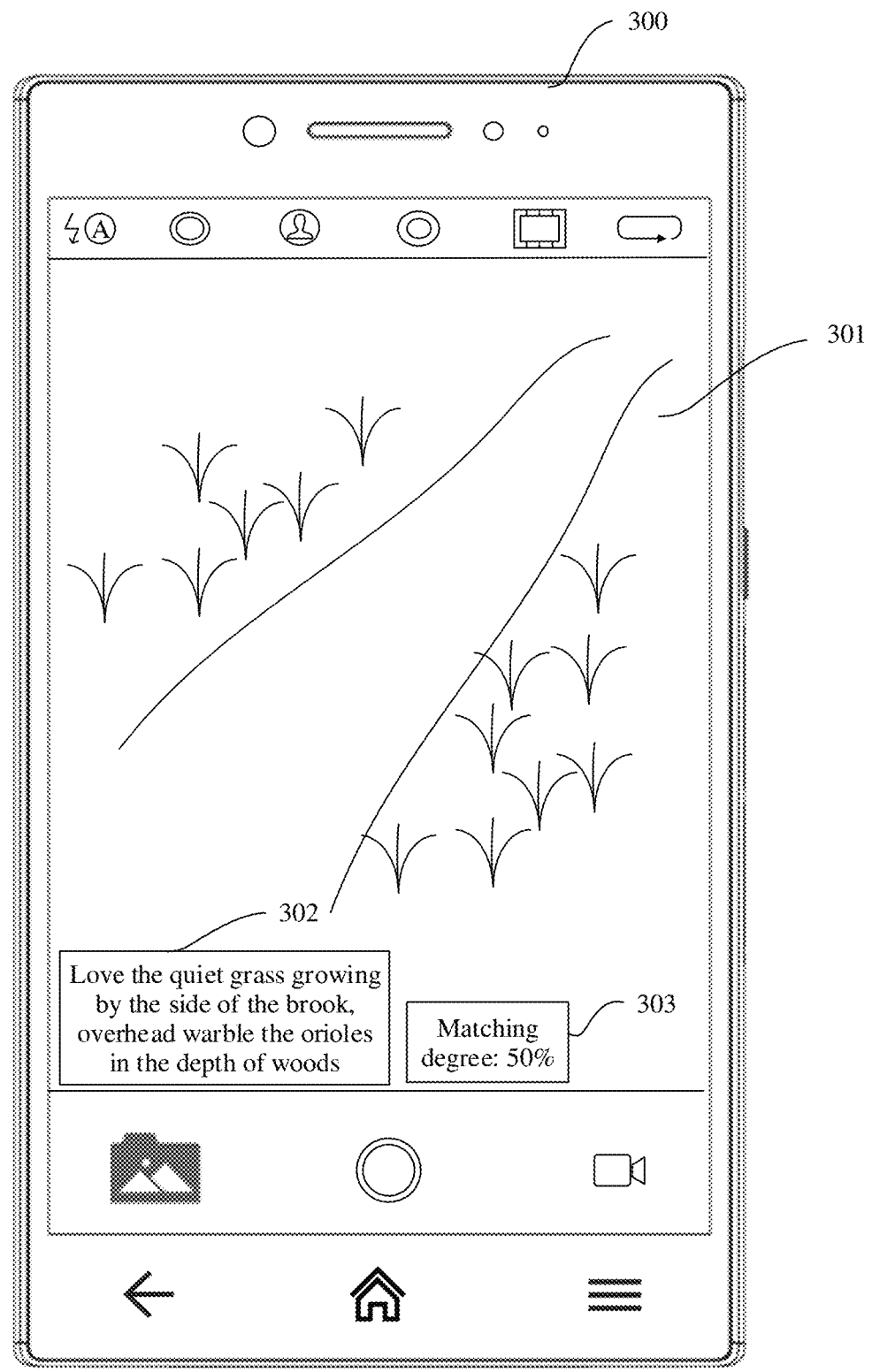
FIG. 3A is a schematic diagram of a display state of a display screen of a mobile phone according to an embodiment of the present invention.

In FIG. 3A, a preview screen 301 is displayed on a display screen of a mobile phone 300, the preview screen 301 includes a preview image and some control keys (such as a flash light and a camera switch), the preview image includes a poem 302 "love the quiet grass growing by the side of the brook, overhead warble the orioles in the depth of woods" matched by the mobile phone 300, and the preview image further includes a matching degree 303: 50%.

Figure 3B:
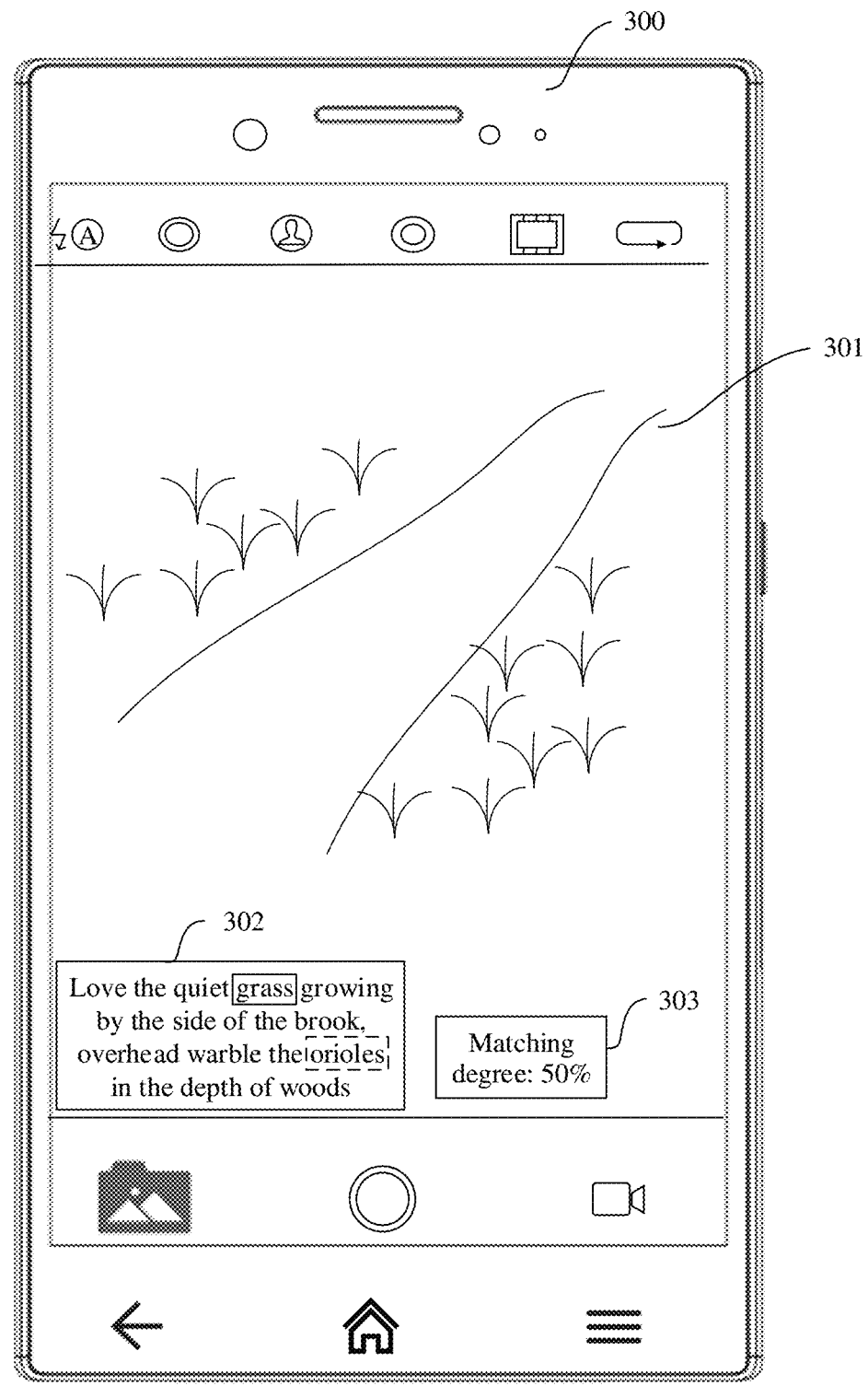
FIG. 3B is a schematic diagram of a display state of a display screen of a mobile phone according to an embodiment of the present invention.

The mobile phone 300 may further display, on the preview screen 301, a keyword that is in the poem 302 and that matches the photographed object included in a current preview image. Refer to FIG. 3B.

In FIG. 3B, a keyword "grass" in the poem 302 "love the quiet grass growing by the side of the brook, overhead warble the orioles in the depth of woods" is in a solid coil, to indicate the user that the photographed object included in the preview image matches "grass" in the poem 302. Certainly, in FIG. 3B, only as an example, the word "grass" is displayed in a solid wire frame. In an actual application, there may be another display manner, such as highlighting, a bubble, or bolding, provided that an objective of informing the user is achieved.

In addition, a keyword "orioles" in the poem 302 "love the quiet grass growing by the side of the brook, overhead warble the orioles in the depth of woods" in FIG. 3B is in a dashed circle, to indicate the user that, in the current preview image, there is a missing photographed object corresponding to the keyword "orioles". In FIG. 3B, only as an example, the word "orioles" is displayed in a dashed wire frame. There may be another manner used to indicate the user that, in the current preview image, there is the missing photographed object corresponding to the keyword "orioles".

Figure 3C:
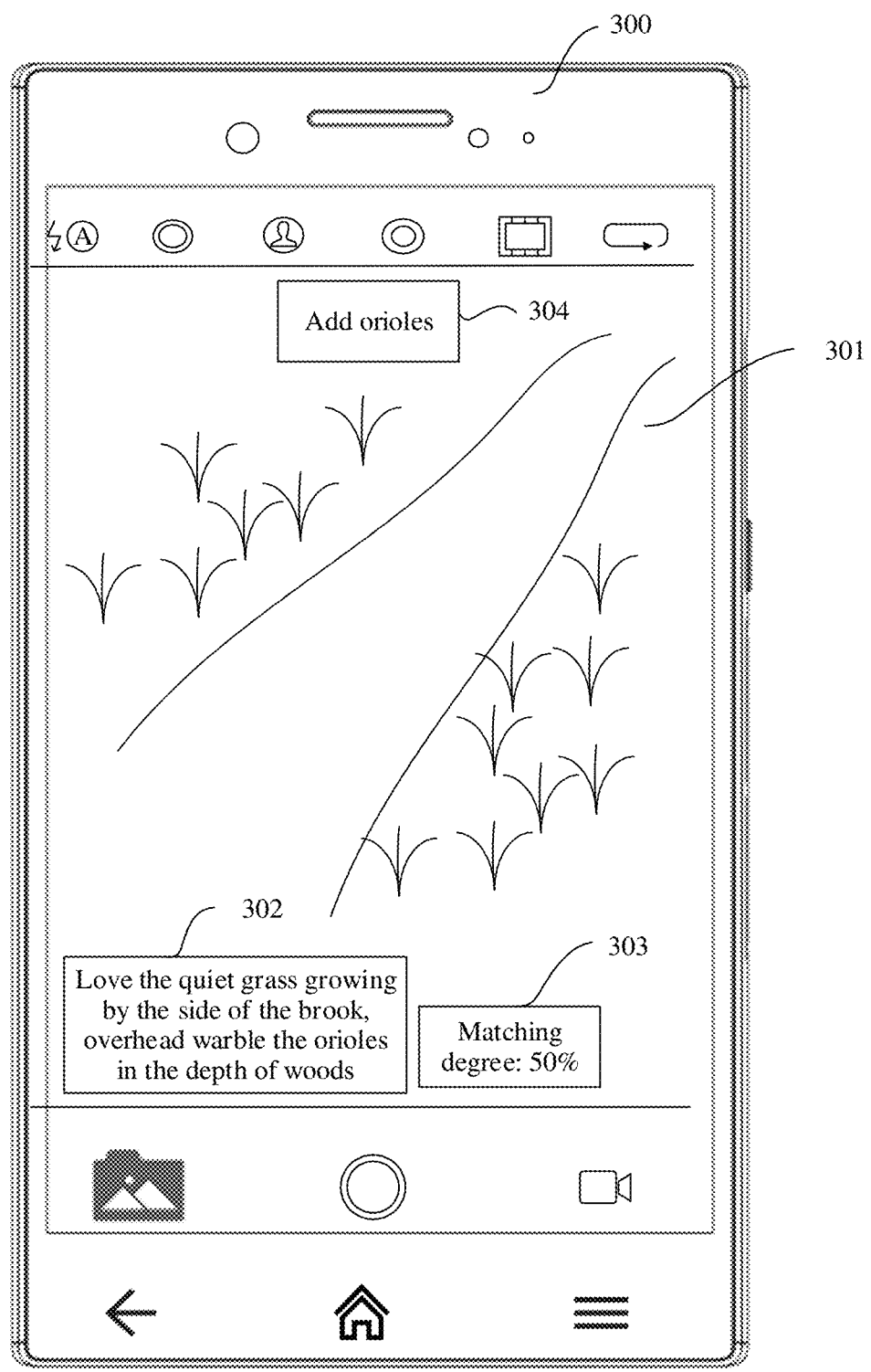
FIG. 3C is a schematic diagram of a display state of a display screen of a mobile phone according to an embodiment of the present invention.

For example, the mobile phone 300 may display a prompt dialog box 304 in the preview image. Text "add orioles" is displayed in the prompt dialog box 304. Refer to FIG. 3C.

Figure 3D:
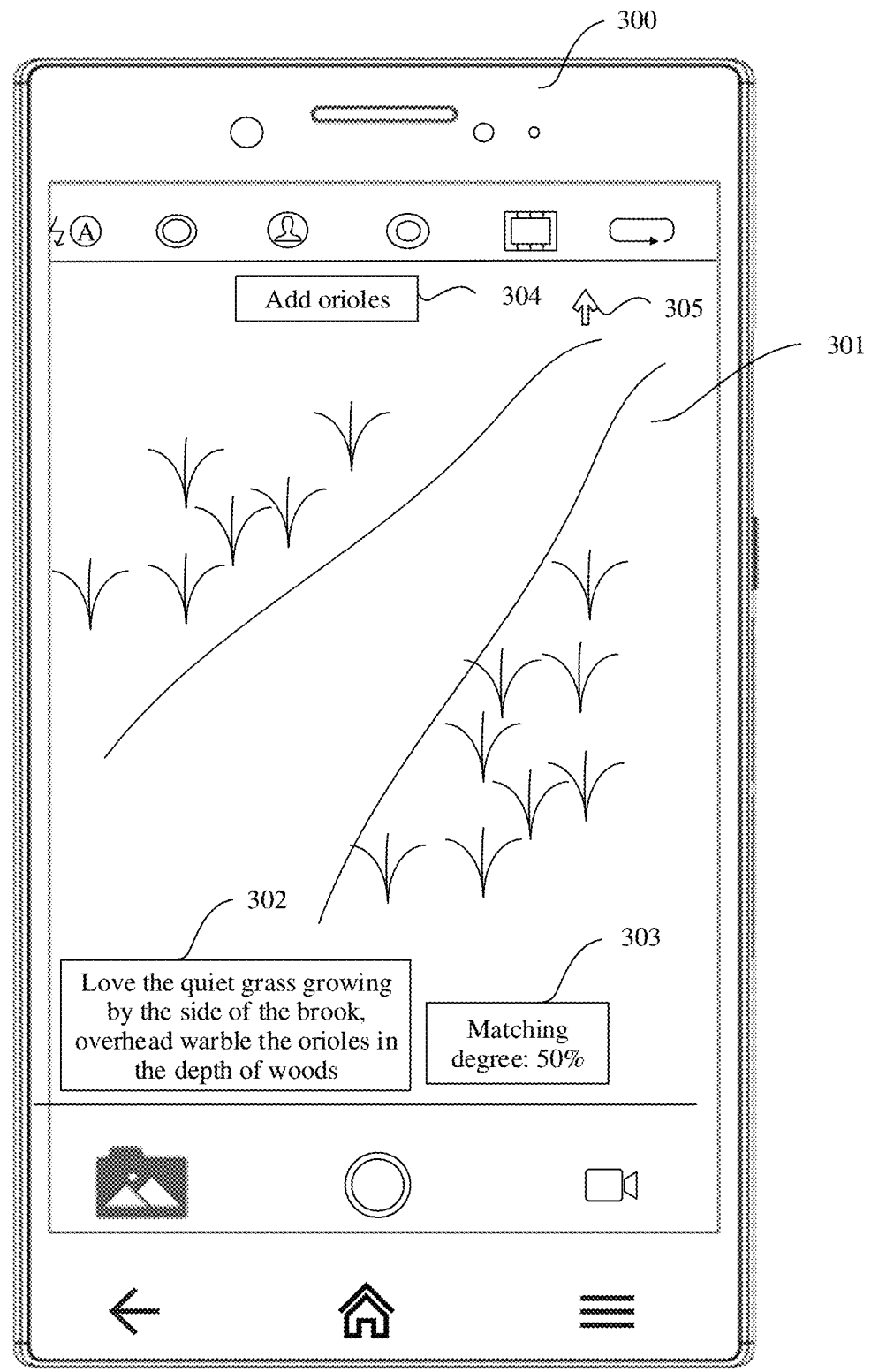
FIG. 3D is a schematic diagram of a display state of a display screen of a mobile phone according to an embodiment of the present invention.

In an example, the mobile phone 300 may further display indication information (in a form of an arrow, text, or the like) of moving a direction, and the indication information about moving the direction is used to instruct the user to adjust a photographing range in an indicated moving direction. Refer to FIG. 3D. An upward arrow 305 is displayed in the preview image in FIG. 3D, to instruct the user to move the photographing range upward. Alternatively, the mobile phone may further display, in the preview image, instruction information for adjusting a focal length (a distance between an object and the photographed object), to instruct the user to increase (or shorten) the focal length, to obtain more (or fewer) photographed objects. The instruction information for adjusting the focal length may be text, an icon, or the like.

Figure 3E:
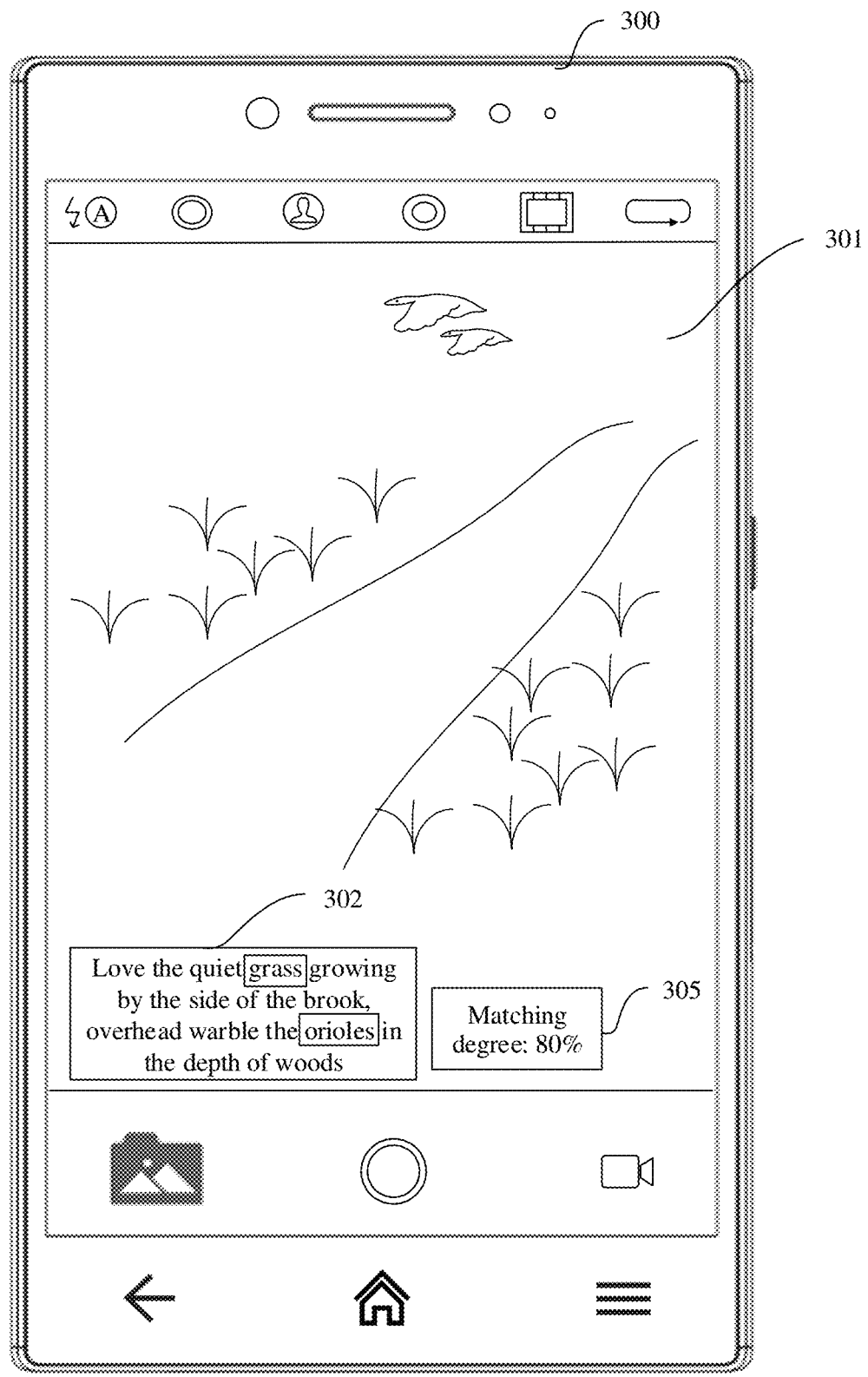
FIG. 3E is a schematic diagram of a display state of a display screen of a mobile phone according to an embodiment of the present invention.

When the user moves the mobile phone 300 or the user adjusts the focal length, more photographed objects or different photographed objects may appear in the preview image. Refer to FIG. 3E.

In FIG. 3E, the preview screen 301 is displayed on the display screen of the mobile phone 300, the preview screen 301 includes a preview image, the preview image includes more photographed objects, and the poem 302 "love the quiet grass growing by the side of the brook, overhead warble the orioles in the depth of woods" matched by the mobile phone, and the preview image further includes a matching degree 305: 80%. In addition, both "grass" and "orioles" in the poem 302 are displayed in solid line frames, to indicate the user that the photographed object included in the current preview image matches "grass" and "orioles".

Figure 4:
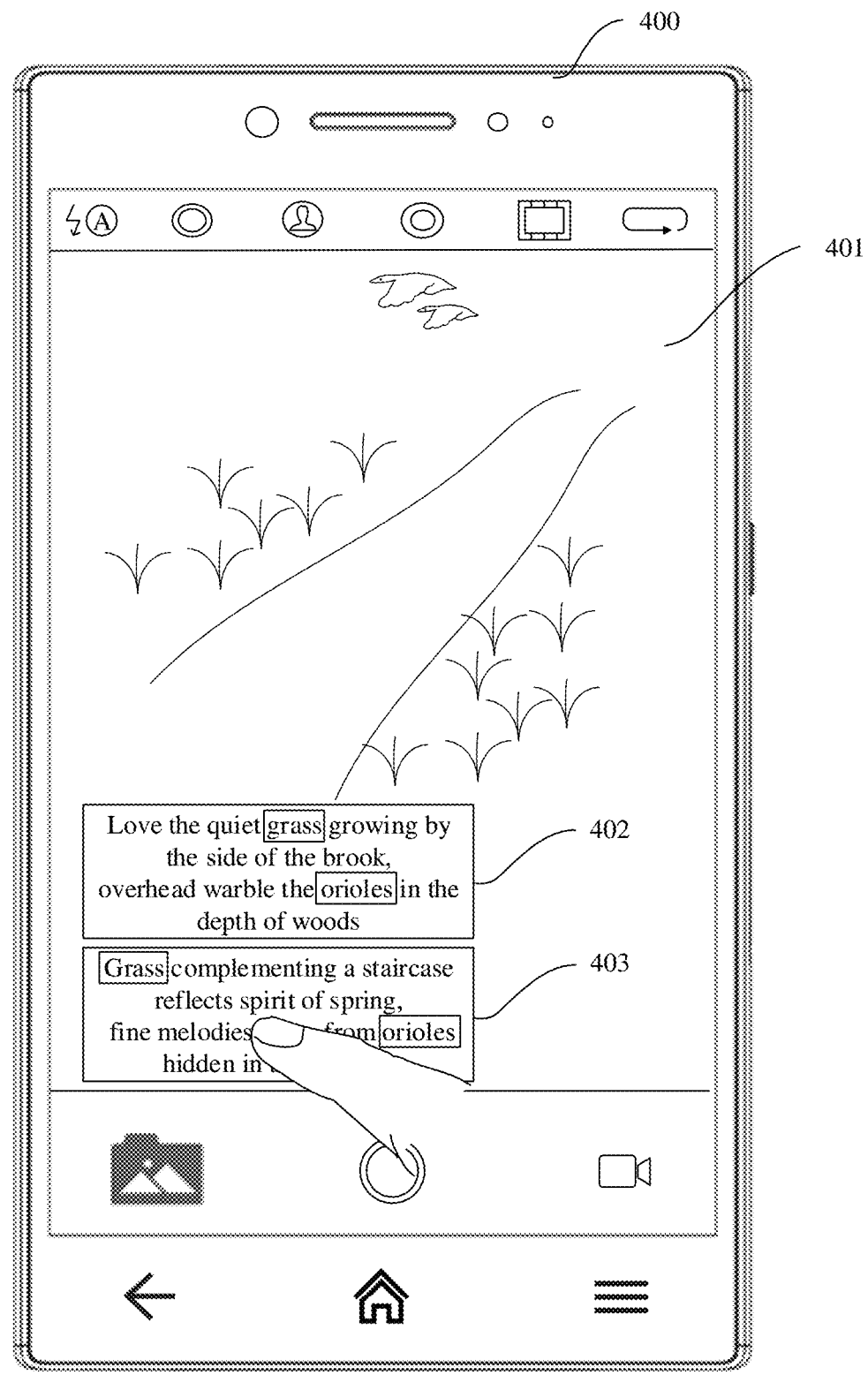
FIG. 4 is a schematic diagram of a display state of a display screen of a mobile phone according to an embodiment of the present invention.

In FIG. 3A to FIG. 3E, that one line of poem is displayed in the preview image is used as an example. Certainly, the mobile phone may further display a plurality of lines of poems in the preview image. For example, there are two lines of poems matched by the mobile phone based on the photographed object in the preview image. The mobile phone may display the two lines of poems in the preview image, and the user may select a line of poem of interest from the two lines of poems. Referring to FIG. 4, a preview screen 401 is displayed on a display screen of a mobile phone 400, a preview image is displayed on the preview screen 401, and the preview image includes two lines of poems: a line of poem 402 and a line of poem 403. The user may select a line of poem by using a user finger and slide left/right to cancel the line of poem. Certainly, there may be another cancellation manner. This is not limited in this embodiment of this application.

Certainly, a poem displayed by the mobile phone is not necessarily preferred by the user. In this embodiment of this application, the user may select a poem based on a requirement of the user.

A possible implementation is that the user may select a type of a poem, and the mobile phone matches an appropriate poem based on the type of the poem selected by the user. For example, if the type of the poem selected by the user is a landscape pastoral poem, the mobile phone recommends a poem of a pastoral poem type to the user.

Figure 5:
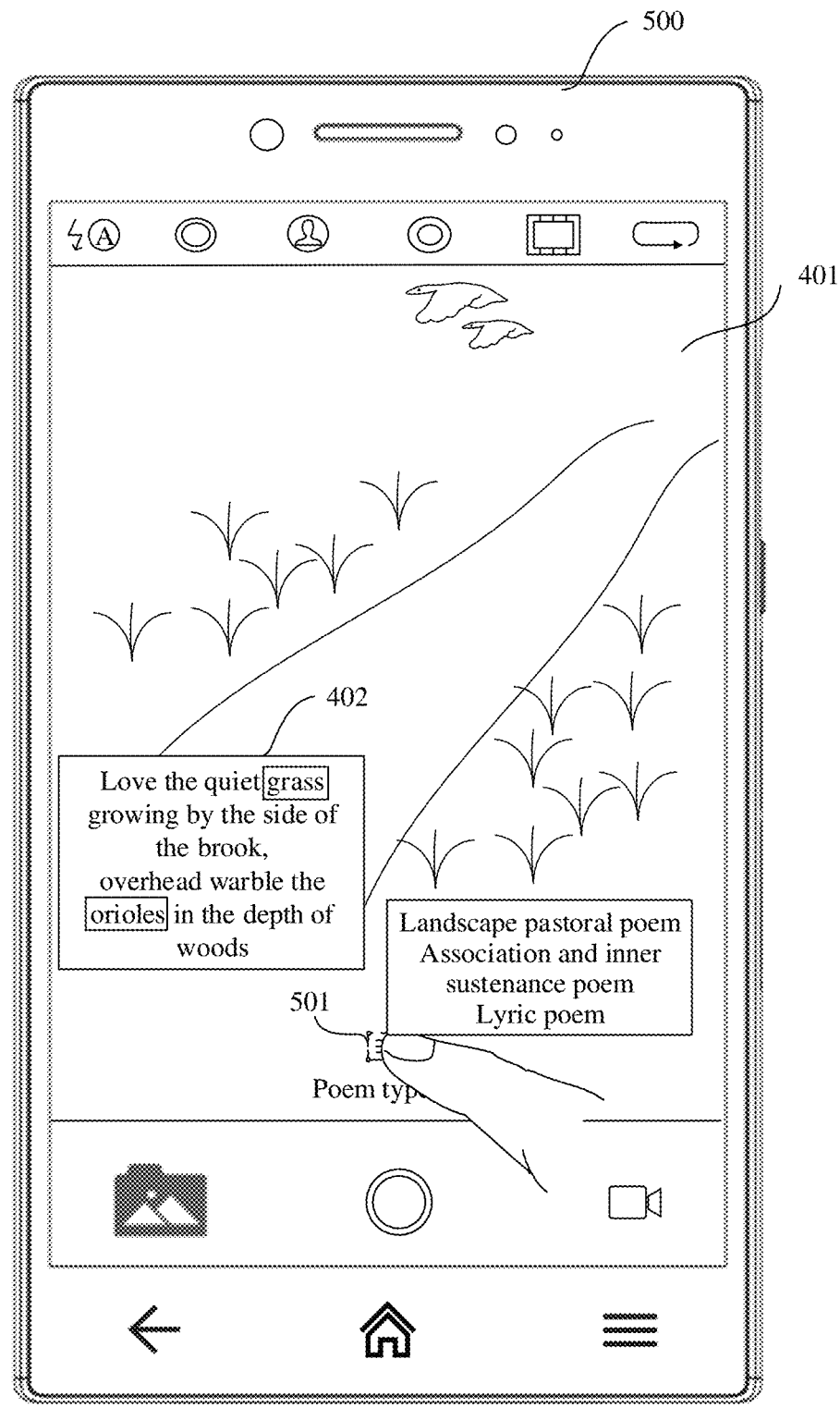
FIG. 5 is a schematic diagram of a display state of a display screen of a mobile phone according to an embodiment of the present invention.

For example, referring to FIG. 5, an identifier 501 of a poem type is displayed in a preview image of a mobile phone 500. When the user triggers the identifier 501, the mobile phone displays a plurality types of poems, and the user selects a type of a poem.

In another possible implementation, if the user wants to try another poem, the user may choose to change the poem.

Figure 6:
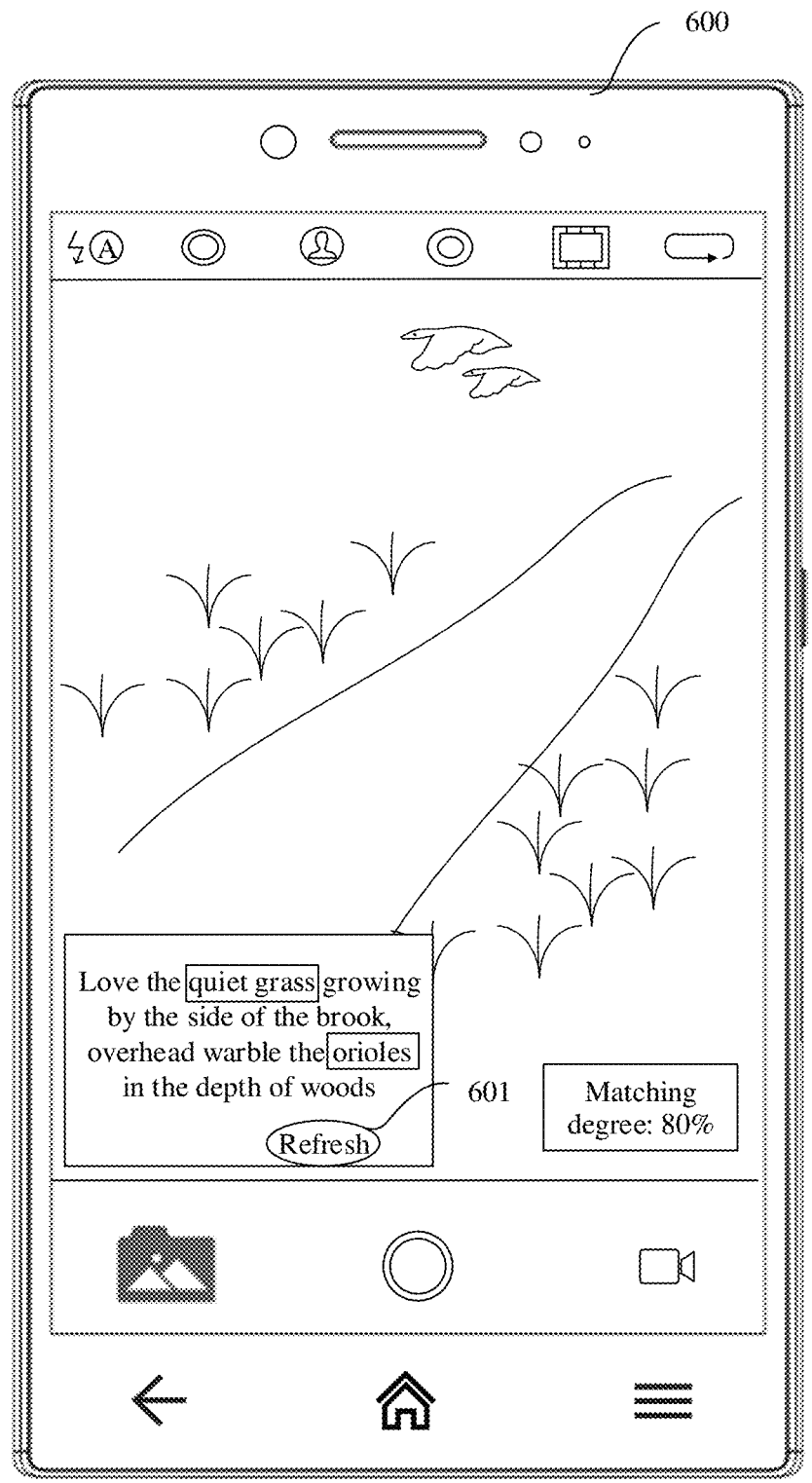
FIG. 6 is a schematic diagram of a display state of a display screen of a mobile phone according to an embodiment of the present invention.

For example, referring to FIG. 6, a refresh (or change a control) control 601 is displayed on a preview screen 601 of a mobile phone 600. After the user triggers the refresh control 601, the mobile phone 600 displays another poem.

It can be learned from the foregoing content that, in a process of matching the text information based on the photographed object, the mobile phone needs to search the database for the appropriate text information. The text information may be stored locally on the mobile phone or stored on a server. Therefore, in a case in which the mobile phone is not connected to a network, after the user triggers the "refresh" control 601, the mobile phone can search for the appropriate text information in a local database. In a case in which the mobile phone is connected to the network, after the user triggers the "refresh" control 601, the mobile phone can search for the appropriate text information both in the local database and in the server. For example, the mobile phone may send a reserved image to the server, and the server performs a process of identifying the photographed object in the reserved image and matching the text information, or the mobile phone may identify the photographed object in the preview image, and then send a keyword corresponding to the identified photographed object to the server. The server matches an appropriate poem based on the received keyword, and then the server sends the matched poem to the mobile phone.

In FIG. 6, that the "refresh" control 601 and a poem are displayed in a same frame is merely an example. The "refresh" control 601 may further be displayed in another position, or may be displayed in another manner, for example, displayed in an icon manner. This is not limited in this embodiment of this application.

Certainly, the user can also view a used poem in "historical record".

Figure 7:
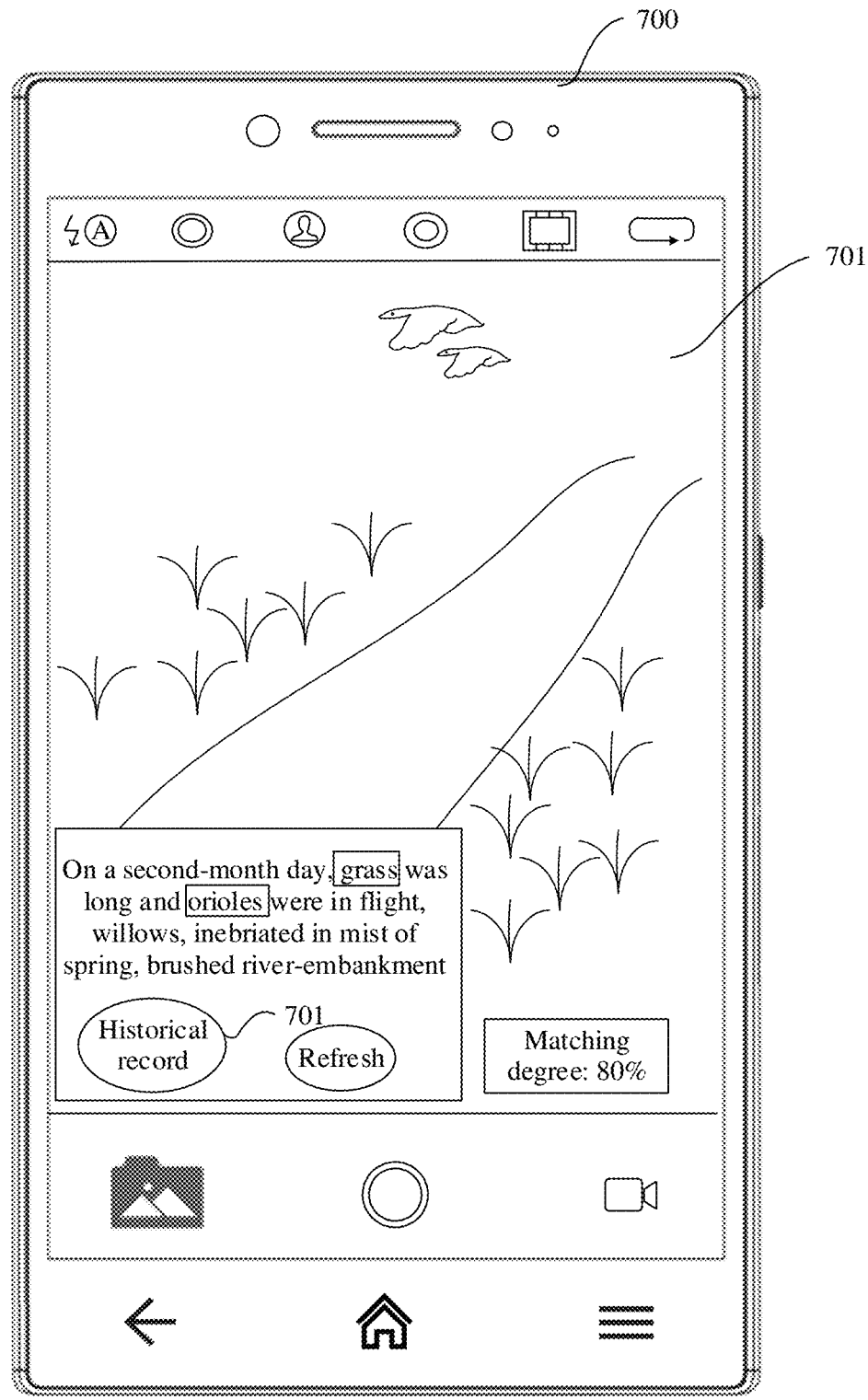
FIG. 7 is a schematic diagram of a display state of a display screen of a mobile phone according to an embodiment of the present invention.

For example, referring to FIG. 7, a "historical record" control 701 is displayed on a display screen of a mobile phone 700. After the user triggers the "historical record" control 701, the mobile phone 700 displays a list, and the list displays a displayed poem. Likewise, in FIG. 7, that the "historical record" control 701 and a poem are displayed in a same frame is merely an example. The "historical record" control 701 may further be displayed in another position, or may be displayed in another manner. This is not limited in this embodiment of this application.

Figure 8:
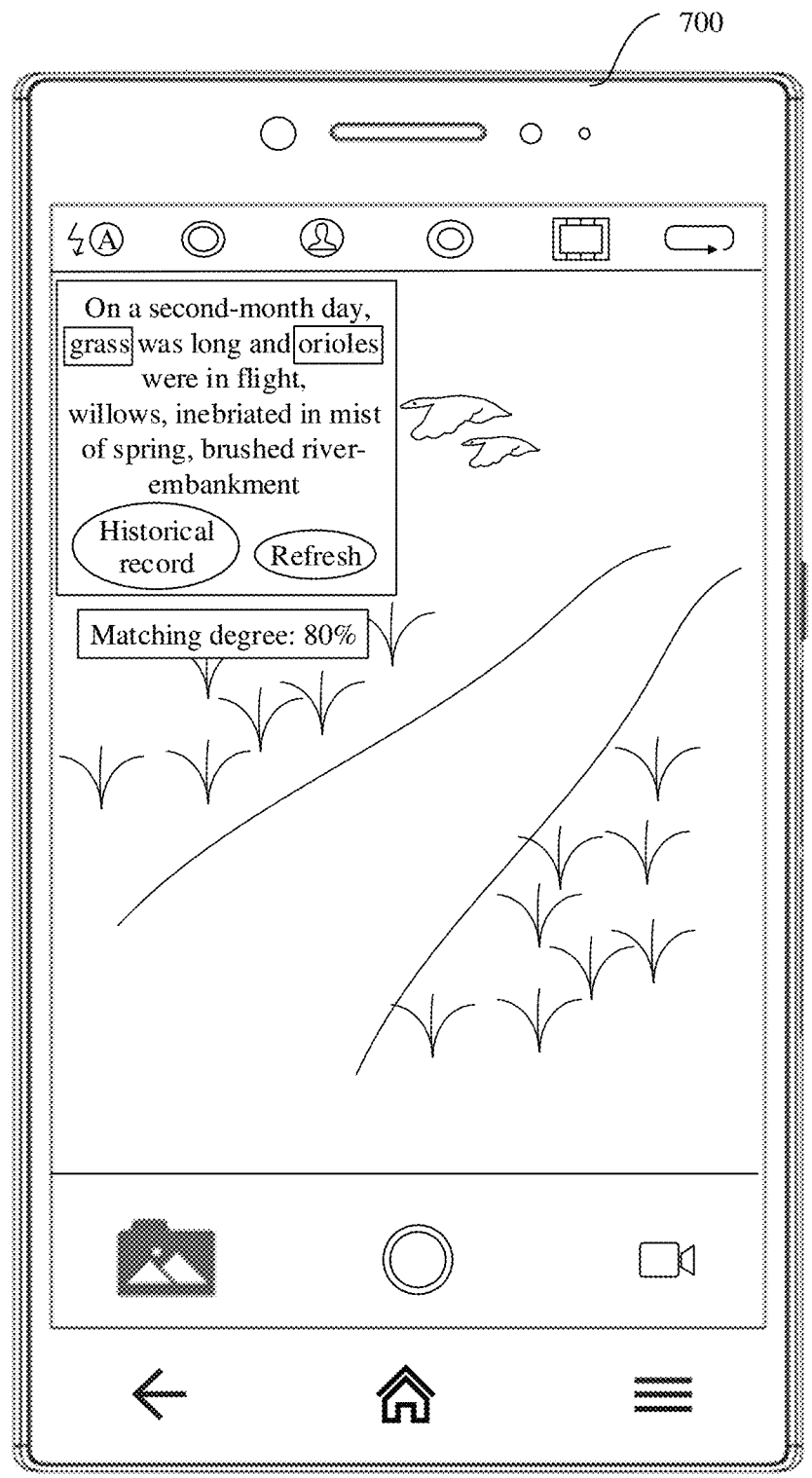
FIG. 8 is a schematic diagram of a display state of a display screen of a mobile phone according to an embodiment of the present invention.

In an example, in this embodiment of this application, the poem and the matching degree information may be specified position information (the position may be set by the user) in the preview image, or may be displayed in a blank area in the preview image. Referring to FIG. 8, the poem and the matching degree information are displayed in the blank area in the preview image of a mobile phone 800. In this manner, the poem and the matching degree information may not shield the photographed object in the preview image as much as possible, and are convenient for the user to view, to help instruct the user to photograph an image.

In another example, because the matching degree information is mainly information used to instruct the user to photograph the image, the matching degree information and the poem may be displayed in the preview image. After the user triggers a photographing button, only the poem is displayed in a final photographed image. The user may select a font form, for example, a font such as a Song typeface or a Kai typeface, for displaying the poem in the finally photographed image. The poem can be displayed statically or dynamically. For example, each word in the poem may be displayed one by one, to present a dynamic display effect. The poem may be displayed in a blank area in the finally photographed image, to avoid shielding display content in the image. Certainly, the solutions provided in this embodiment of this application are mainly used to instruct the user to photograph an image with better quality. Therefore, after the user triggers the photographing button, the poem may not be displayed in the final photographed image, or after the user triggers the photographing button, two photographed images are finally obtained: One does not include a poem, and the other includes a poem.

In the foregoing description, after identifying the photographed object from the preview image, the mobile phone determines poem that matches the photographed object, and then displays the poem and the prompt information in the preview image. In another implementation, the mobile phone may not display the poem, but only display the prompt information, to indicate a missing or redundant photographed object in the preview image to the user. The user may photograph an image with a better effect based on the prompt information. In this case, after the mobile phone detects that the user triggers the photographing button, the photographed object may not include the poem.

In the foregoing embodiment, the prompt information mainly indicates the missing or redundant photographed object in the preview image to the user. The prompt information may further instruct the user to replace a redundant photographed object in the preview image with another photographed object. In this manner, the mobile phone may first determine a redundant first photographed object, then determine a missing second photographed object, and then output the prompt information to instruct the user to replace the first photographed object with the second photographed object.

In the photographing manner provided in this embodiment of this application, the terminal device may identify the photographed object in the preview image, and recommend the text information such as the poem or the song that matches the photographed object, and the prompt information to the user, to indicate the missing or redundant photographed object in the preview image to the user. The user may adjust the photographing range/angle and the like based on the prompt information, to obtain a high-quality image. In this manner, a user who does not grasp a photographing technique can also photograph the high-quality image.

In an actual application, the user may select to enable a poem photographing mode or disable a poem photographing mode.

In an example, a poem matching mode may be set on the preview screen of the mobile phone. After the user enables the poem matching mode, the mobile phone may perform steps S201 to S203.

Figure 9A:
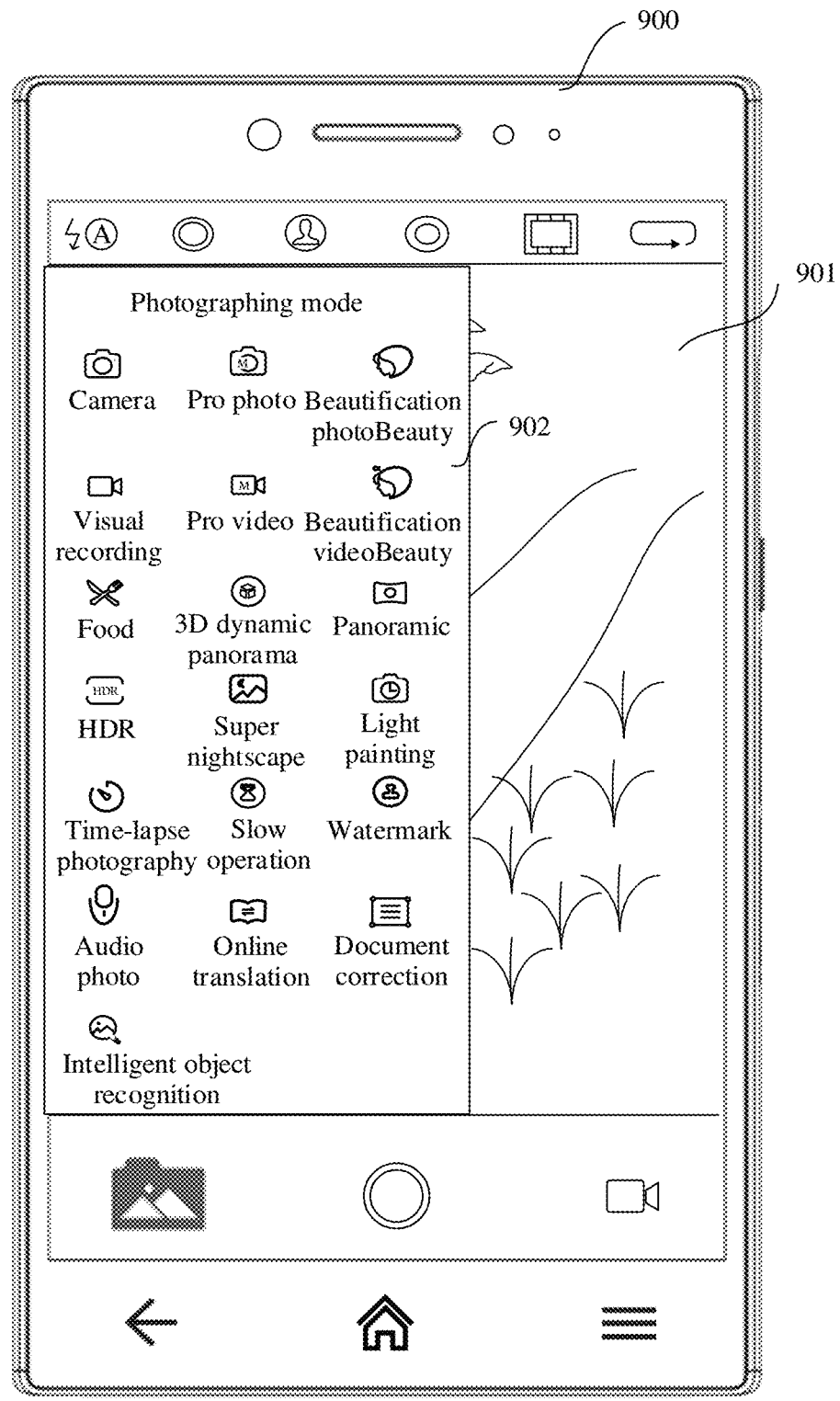
FIG. 9A is a schematic diagram of a display state of a display screen of a mobile phone according to an embodiment of the present invention.

For example, FIG. 9A is a schematic diagram of a preview screen displaying on a display screen of a mobile phone.

In FIG. 9A, the preview screen 901 is displayed on the display screen of the mobile phone 900, the preview screen 901 includes a photographing mode selection box 902, and the photographing mode selection box includes a control 903 corresponding to a poem mode. The user triggers the control 903 to enable the poem mode. The mobile phone performs the steps S201 to S203 in the embodiment shown in FIG. 2, and the text information and the matching degree information are displayed on the display screen. If the user triggers the control 903 again, the mobile phone 900 disables the poem mode, and the text information and the matching degree information on the display screen of the mobile phone 900 disappear.

Figure 9B:
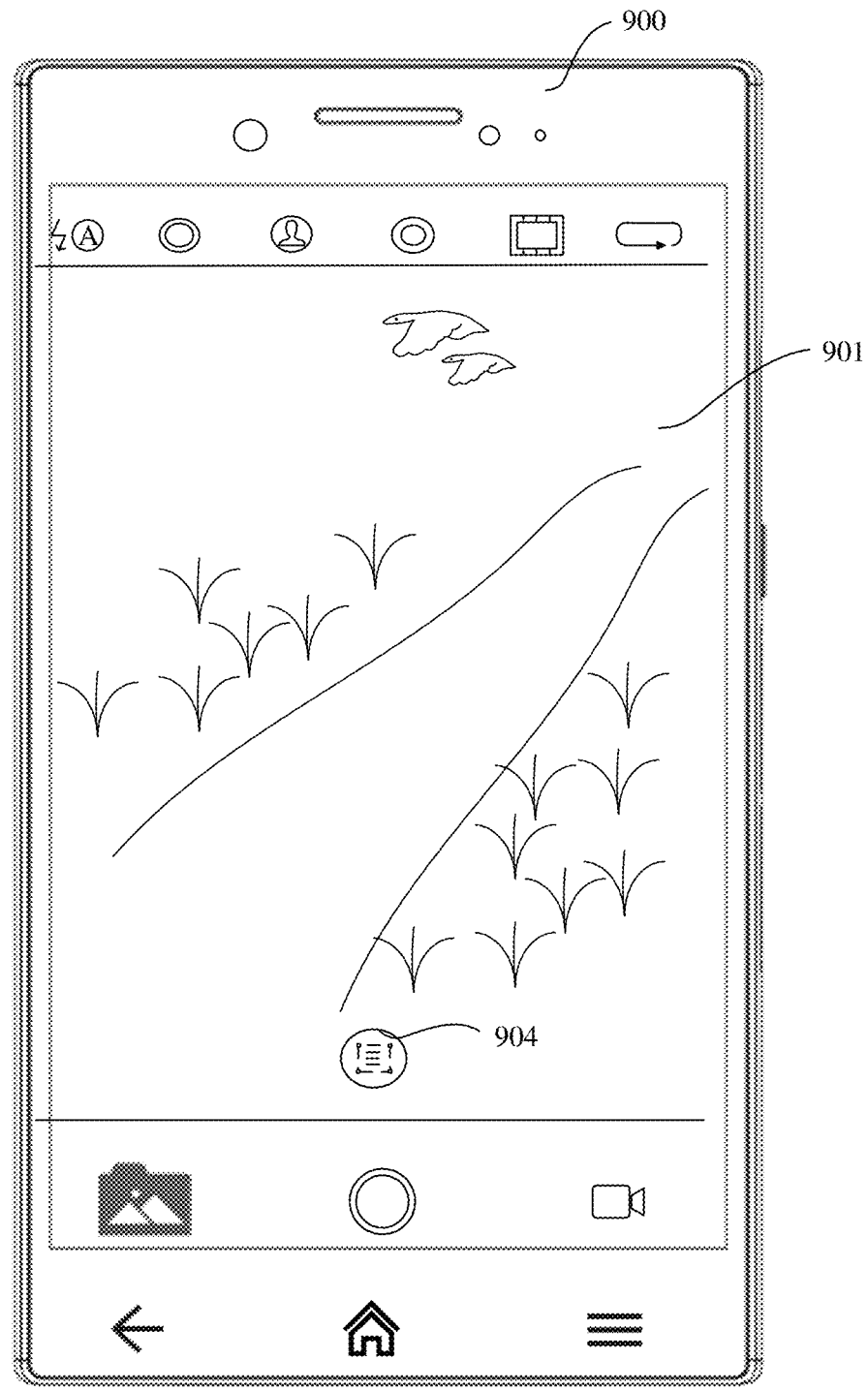
FIG. 9B is a schematic diagram of a display state of a display screen of a mobile phone according to an embodiment of the present invention.

Generally, when photographing a landscape, the user more expects to attach text information with verse to a photographed landscape photo, to improve an artistic effect of the photo. Therefore, in an example, when detecting that the photographed object included in a current preview image belongs to a landscape type such as a mountain, water, a plant, a desert, or an attic, the mobile phone may display an identifier (text or an icon) of the poem mode in the preview image, to remind the user to enable the poem mode. Refer to FIG. 9B.

In FIG. 9B, the preview screen 901 is displayed on the display screen of the mobile phone 900, the preview screen 901 includes the preview image, and the preview image includes an icon 904 of the poem mode. When the user triggers the icon 904, the mobile phone 900 enables the poem mode. When the user triggers the icon 904 again, the mobile phone 900 disables the poem mode.

Figure 10:
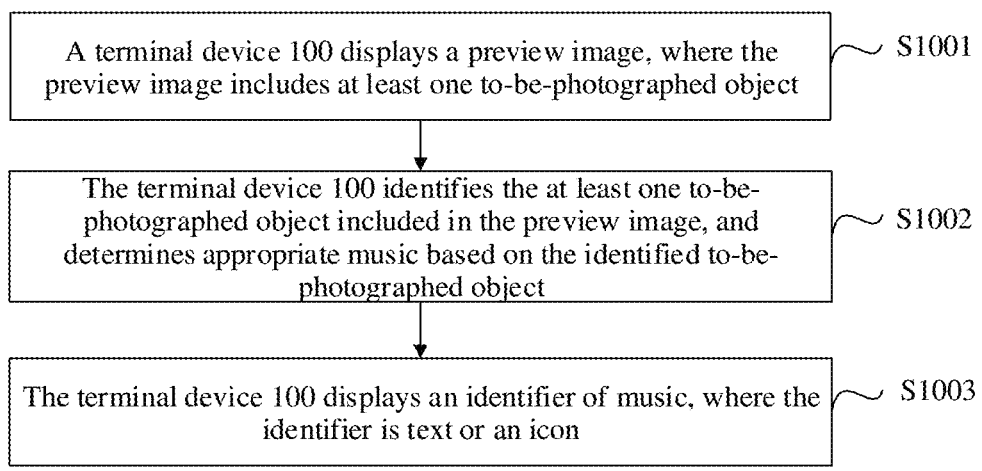
FIG. 10 is a flowchart of a photographing method according to an embodiment of the present invention.

In the embodiment shown in FIG. 2, the terminal device may identify the photographed object in the preview image, and recommend the text information such as the poem or the song that matches the photographed object, and the prompt information to the user, to indicate the missing or redundant photographed object in the preview image to the user. The user may adjust the photographing range/angle and the like based on the prompt information, to obtain the high-quality image. The following describes another embodiment. In the following embodiment, after identifying a plurality of photographed objects included in a preview image, a terminal device may recommend music that matches the identified photographed object, so that a user may synthesize the recommended music and the photographed image into an audio image. The method may be applicable to the terminal device 100 shown in FIG. 1. Therefore, the terminal device 100 is used as an example in the following description. Referring to FIG. 10, a procedure of the method includes:

S1001: The terminal device 100 displays a preview image, where the preview image includes at least one photographed object.

S1002: The terminal device 100 identifies the at least one photographed object included in the preview image, and matches appropriate music based on the identified photographed object.

In an example, when matching the appropriate music based on the identified photographed objects, the terminal device 100 may match the music by keyword matching.

For example, after identifying the photographed objects, the terminal device 100 extracts characteristic information from the photographed objects, determines, based on a mapping relationship between characteristic information and keywords, keywords corresponding to the extracted characteristic information, and then matches, in the database, music whose lyrics include these keywords or whose name includes these keywords based on the determined keywords.

In another example, when matching the appropriate music based on the identified photographed objects, the terminal device 100 may match the music based on information about a scenario in which the photographed objects are located.

For example, when the terminal device 100 identifies that the photographed objects are in a scenario such as a bar, a karaoke, or a stage, the terminal device 100 may search for music appropriate for playing in the bar, the karaoke, or the stage.

In another example, when matching the appropriate music based on the identified photographed objects, the terminal device 100 may match the music based on information about an environment in which the terminal device 100 is currently located.

For example, in a process of collecting the preview image, the terminal device 100 may also collect a sound of an ambient environment. When a collected sound of the ambient environment is comparatively low, the terminal device 100 may search for light music, or when a collected sound of the ambient environment is comparatively loud, heavy music may be selected.

In another example, when matching the appropriate music based on the identified photographed objects, the terminal device 100 may match the music based on a current time.

For example, the terminal device 100 may detect the current time, and determine the appropriate music based on the detected time. For example, if the current time is at night, the terminal may search for light music.

In another example, when matching the appropriate music based on the identified photographed objects, the terminal device 100 may match the music based on a current geographic location.

For example, the terminal device 100 may detect the current geographical location, and search for the appropriate music based on the geographical location. For example, if the terminal device 100 detects that the terminal device 100 is currently located in Hong Kong, the terminal device 100 searches for Cantonese music, and if the terminal device 100 detects that the terminal device 100 is currently located in America, the terminal device 100 searches for European and American music.

In this embodiment of this application, the terminal device 100 may also match another sound other than the music. For example, when the terminal device 100 identifies that the photographed objects include an animal, the terminal device 100 may search for a sound of the animal from a server or locally. For example, if the photographed objects include a bird, the terminal device 100 may search for a bird call.

In an actual operation process, the terminal device may combine the foregoing several manners for use.

In this embodiment of this application, the music may be stored locally on the terminal device 100 or stored on the server. Therefore, in a case in which the terminal device 100 is not connected to a network, the terminal device 100 may search for the appropriate music in a local database. In a case in which a mobile phone is connected to the network, the terminal device 100 can search for the appropriate music both locally and in the server. For example, the terminal device 100 may send the preview image to the server. The server identifies the photographed objects in the preview image and matches the appropriate music. Then, the server sends information related to the matched music to the terminal device 100. Alternatively, the terminal device 100 may identify the photographed objects in the preview image, and then send keywords corresponding to the identified photographed objects to the server. The server matches the appropriate music based on the received keywords, and then the server sends information related to the matched music to the terminal device 100.

In this embodiment of this application, the music may be a music segment, for example, a music segment whose total playing duration is 10 s to 12 s. Therefore, the terminal device 100 or the server may store a music segment that has been captured, or after determining the appropriate music, the terminal device 100 or the server captures an appropriate music segment from the music, and then pushes the music segment to a user.

S1003: The terminal device 100 displays an identifier of the music, where the identifier is text or an icon.

Figure 11:
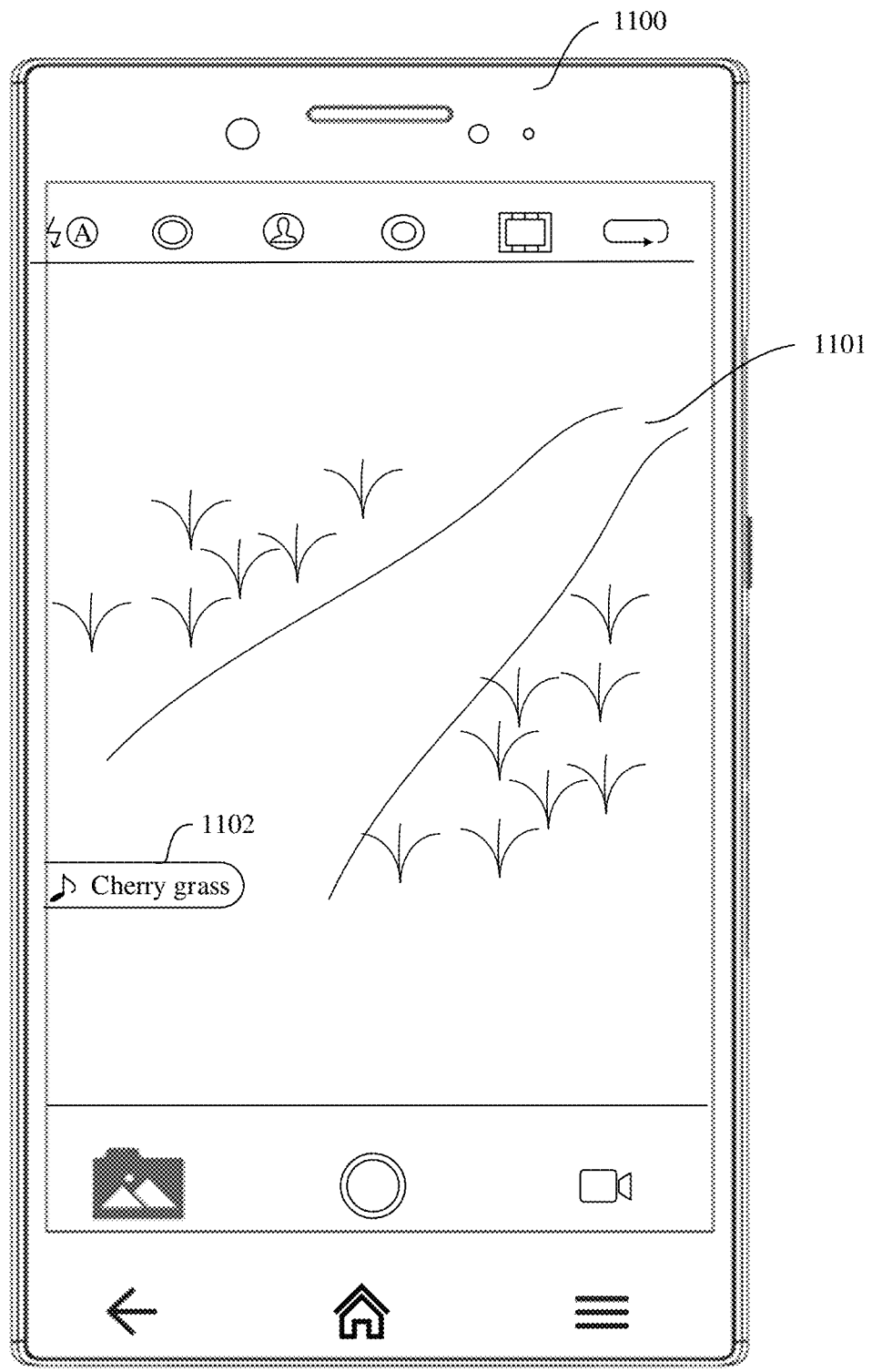
FIG. 11 is a schematic diagram of a display state of a display screen of a mobile phone according to an embodiment of the present invention.

FIG. 11 is a schematic diagram of a display state of a display screen of a mobile phone.

In FIG. 11, a preview screen 1101 is displayed on the display screen of the mobile phone 1100, the preview screen 1101 includes the preview image, and the preview image includes an identifier 1102 of music matched by the mobile phone 1100. When the user triggers the identifier 1102, the music may be played. If satisfied with the music, the user may trigger a photographing control. The terminal device 100 synthesizes the music with the photographed image to obtain the audio image.

In an actual application, the user may select to enable a music mode or disable a music mode.

In an example, the music mode may be set on the preview screen of the terminal device 100. After the user enables the music mode, the terminal device 100 may perform steps S1001 to S1003.

Figure 12:
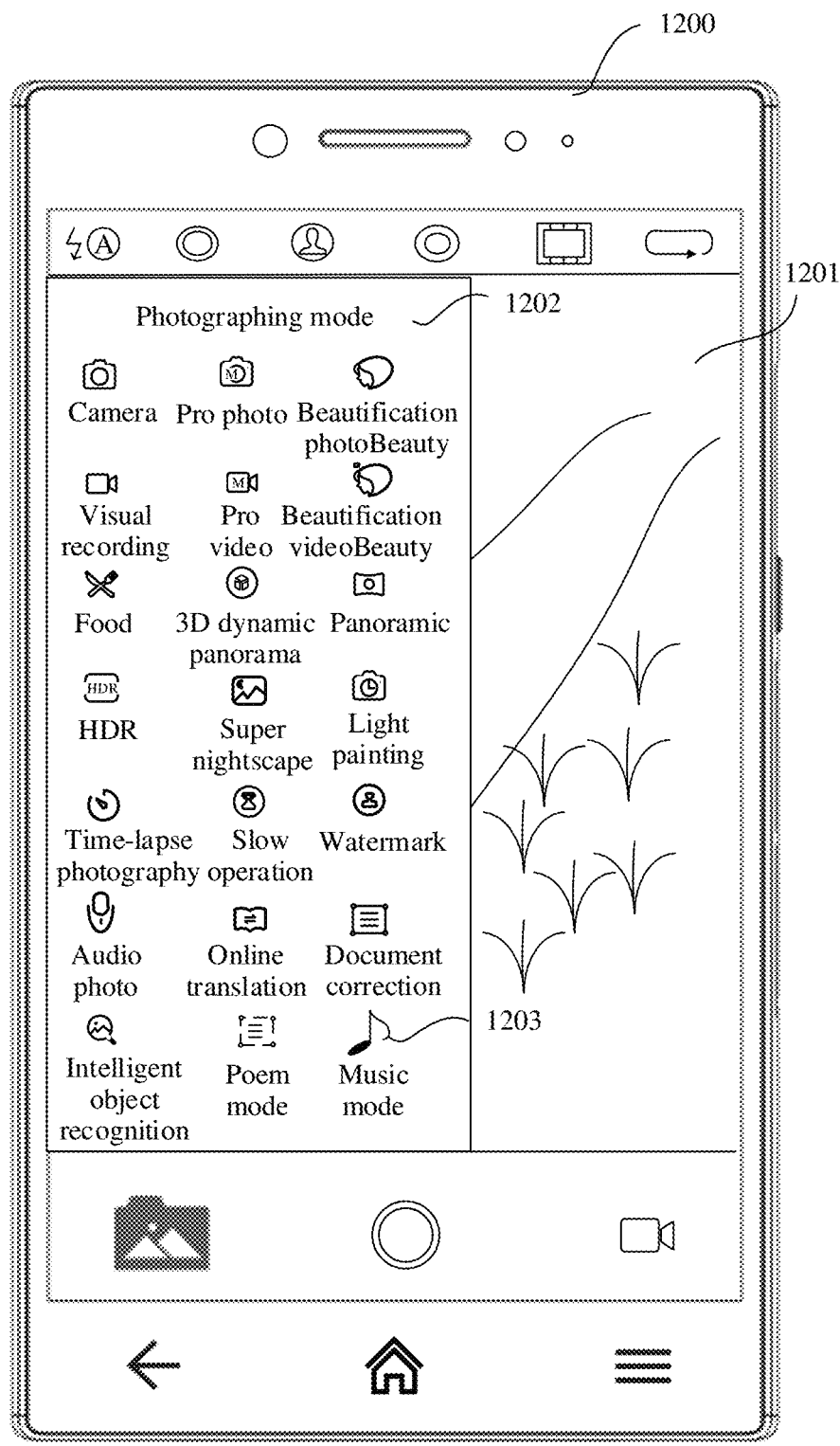
FIG. 12 is a schematic diagram of a display state of a display screen of a mobile phone according to an embodiment of the present invention.

For example, FIG. 12 is a schematic diagram of a preview screen displaying on a display screen of a mobile phone.

In FIG. 12, a preview screen 1201 is displayed on the display screen of the mobile phone 1200, the preview screen 1201 includes a photographing mode selection box 1202, and the photographing mode selection box 1202 includes a control 1203 corresponding to the music mode. The user triggers the control 1203 to enable the music mode. The mobile phone 1200 performs the steps S1001 to S1003 in the embodiment shown in FIG. 10, and an identifier of recommended music is displayed on the display screen. If the user triggers the control 1203 again, the mobile phone 1200 disables the music mode, and the identifier of the music on the display screen of the mobile phone 1200 disappears.

Various implementations of this application may be randomly combined to achieve different technical effects. Therefore, various implementations in the embodiment shown in FIG. 2 may also be applicable to the embodiment shown in FIG. 10. In other words, when a photo or a video is photographed, the method in the embodiment shown in FIG. 2 may be used to indicate the missing or redundant photographed object to the user, and the method in the embodiment shown in FIG. 10 may be used to display the identifier of the music. After the photographing, a photo or a video including text information and music may be obtained. To be specific, the user may obtain a multimedia photo or video. When the user views the photo, the terminal can display the corresponding text information in the photo, and can further play the corresponding music.

In the embodiments provided in this application, the method provided in this embodiment of this application is described from a perspective in which the terminal device is used as an execution body. To implement functions in the method provided in the embodiments of this application, a terminal device may include a hardware structure and/or a software module, and implement the functions in a form of the hardware structure, the software module, or a combination of the hardware structure and the software module. Whether a function in the functions is performed by using the hardware structure, the software module, or the combination of the hardware structure and the software module depends on a specific application and a design constraint condition of the technical solution.

Figure 13:
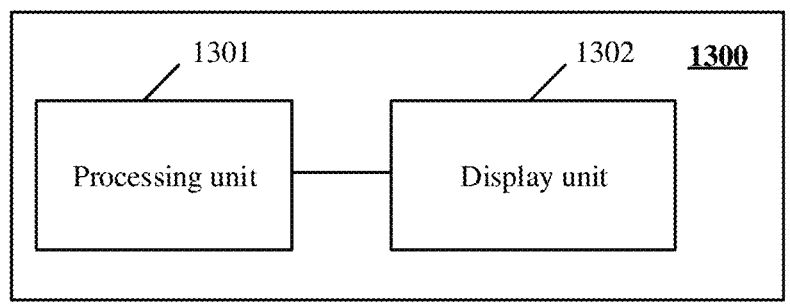
FIG. 13 is a schematic diagram of a structure of a terminal device according to an embodiment of the present invention.

Based on a same concept, FIG. 13 shows a terminal device 1300 according to an embodiment of this application.

The terminal device 1300 may be a terminal device capable of image photographing, and the terminal device may perform the method in the embodiment shown in FIG. 2 to FIG. 9. As shown in FIG. 13, the terminal device 1300 includes a processing unit 1301 and a display unit 1302.

The processing unit 1301 is configured to receive a first operation, and start a camera in response to the first operation.

The display unit 1302 is configured to display a first preview screen including a first preview image, and the first preview image includes at least one photographed object.

The processing unit 1301 is further configured to output first prompt information based on the first preview image, and the first prompt information is used to indicate a missing or redundant photographed object in the first preview image. The first prompt information may be language prompt information or text prompt information. For example, the processing unit 1301 may output the voice prompt information by using a loudspeaker, or the processing unit 1301 may output the text prompt information by using the display unit 1302.

Optionally, after outputting the first prompt information based on the first preview image, the processing unit 1301 is further configured to receive a second operation, and in response to the second operation, display, by using the display unit 1302, a second preview screen including a second preview image. The second preview image is different from the first preview image, and the second preview image includes at least one photographed object.

The processing unit 1301 is further configured to output second prompt information based on the second preview image. The second prompt information is different from the first prompt information, and the second prompt information is used to indicate a missing or redundant photographed object in the second preview image. Likewise, the second prompt information may also be language prompt information or text prompt information. For example, the processing unit 1301 may output the voice prompt information by using a loudspeaker, or the processing unit 1301 may output the text prompt information by using the display unit 1302.

Optionally, a preview image includes M photographed objects, the preview image is the first preview image or the second preview image, and if N photographed objects in the M photographed objects match preset text information, the redundant photographed object is remaining (M−N) photographed objects obtained after the N photographed objects are removed from the M photographed objects, or if text information that matches the M photographed objects includes a keyword corresponding to another photographed object other than the M photographed objects, the another photographed object is the missing photographed object, where N≥1, and N<M.

Optionally, the first prompt information is displayed on the first preview screen; and the second prompt information is displayed on the second preview screen.

Optionally, the processing unit 1301 is further configured to output matched first text information based on the first preview image, and display the first text information on the first preview screen by using the display unit 1302.

Optionally, the processing unit 1301 is further configured to output matched second text information based on the second preview image, and display the second text information on the second preview screen by using the display unit 1302.

Optionally, the first text information includes at least one piece of text information, or the second text information includes at least one piece of text information.

Optionally, the processing unit 1301 is further configured to output first matching degree information based on the first preview image, and display the first matching degree information on the first preview screen by using the display unit 1302. The first matching degree information is used to indicate a matching degree between the first text information and the first preview image.

Optionally, the processing unit 1301 is further configured to output second matching degree information based on the first preview image, and display the second matching degree information on the second preview screen by using the display unit 1302. The second matching degree information is used to indicate a matching degree between the second text information and the second preview image.

Optionally, the processing unit 1301 is further configured to output first direction indication information based on the first preview image, and display the first direction indication information on the first preview screen by using the display unit 1302. The first direction indication information is used to instruct a user to move the terminal device in an indicated first direction.

Optionally, the processing unit 1301 is further configured to output second direction indication information based on the first preview image, and display the second direction indication information on the second preview screen by using the display unit 1302. The second direction indication information is used to instruct the user to move the terminal device in an indicated second direction.

Optionally, a second control is displayed in the first preview image, and the second control is configured to trigger displaying a type of text information. In response to a user's operation of triggering the second control, the processing unit 1301 displays a first list by using the display unit 1302. The first list includes at least one type of the text information. In response to a user's operation of selecting a first type, the processing unit 1301 displays first text information by using the display unit 1302. A type of the first text information is the first type.

Optionally, the first preview screen includes a first photographing control, and the processing unit 1301 is further configured to obtain two first photographed images in response to an operation used to trigger the first photographing control. One of the two first photographed images includes the first text information, and the other first photographed image does not include the first text information.

Optionally, the second preview screen includes a second photographing control, and the processing unit 1301 is further configured to obtain two second photographed images in response to an operation used to trigger the second photographing control. One of the two second photographed images includes the second text information, and the other second photographed image does not include the second text information.

Optionally, a preview image includes M photographed objects, and the preview image is the first preview image or the second preview image. When M is 1, and when the processing unit 1301 is configured to match text information based on N photographed objects in the M photographed objects, the processing unit 1301 is specifically configured to extract characteristic information of the photographed object, determine based on a mapping relationship between characteristic information and a keyword, a keyword corresponding to the extracted characteristic information; and determine text information including the keyword.

Optionally, a preview image includes M photographed objects, and the preview image is the first preview image or the second preview image. When M is greater than or equal to 2, and when the processing unit 1301 is configured to match text information based on N photographed objects in the M photographed objects, the processing unit 1301 is specifically configured to determine the N photographed objects whose weights are greater than a preset weight in the M photographed objects, where the weight is used to indicate a proportion of a display area of one photographed object to a display area of an entire preview image; extract characteristic information from each of the N photographed objects to obtain N pieces of characteristic information in total; determine, based on a mapping relationship between characteristic information and a keyword, N keywords corresponding to the extracted N pieces of characteristic information; and determine text information including the N keywords.

Optionally, when the processing unit 1301 matches the text information based on the N photographed objects in the M photographed objects, the processing unit 1301 is further configured to determine at least two types of text information based on the N photographed objects in the M photographed objects, detect current time information/geographical location information; and select one type of text information from the at least two types of text information based on the time information/geographical location information; or select one type of text information from the at least two types of text information according to a priority policy, where the priority policy includes a priority sequence between the at least two types of text information.

Optionally, if the user selects other text information other than the matched text information, the processing unit 1301 is further configured to determine whether a quantity of times that the user selects the other text information exceeds a preset quantity of times; when the quantity of times that the user selects the other text information exceeds the preset quantity of times, set a first priority level of the other text information to a second priority level, where the second priority level is higher than the first priority level; and update the priority policy based on the second priority level of the other text information.

In a specific implementation, the processing unit 1301 may be equivalent to a processor of the terminal device, and the display unit 1302 may be equivalent to a display screen of the terminal device.

Figure 14:
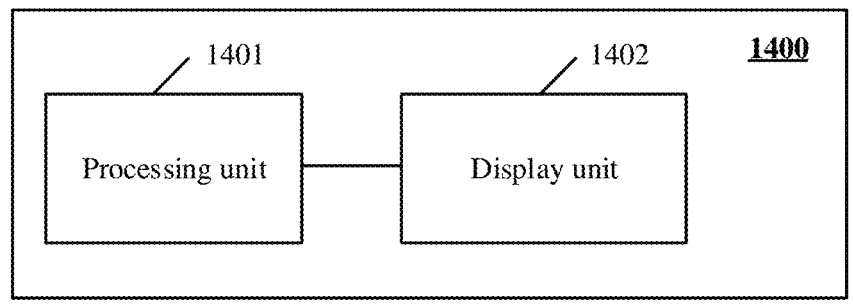
FIG. 14 is a schematic diagram of a structure of a terminal device according to an embodiment of the present invention.

Based on a same concept, FIG. 14 shows a terminal device 1400 according to an embodiment of this application. The terminal device 1400 may be a terminal device capable of image photographing, and the terminal device may perform the method in the embodiment shown in FIG. 10 to FIG. 12. As shown in FIG. 14, the terminal device 1400 includes a processing unit 1401 and a display unit 1402. The processing unit 1401 is configured to receive a first operation, and start a camera in response to the first operation.

The display unit 1402 is configured to display a first preview screen including a first preview image, and the first preview image includes at least one photographed object. The display unit 1402 is further configured to display a first identifier of first music on the first preview screen, the first music is music matched by the terminal device based on the at least one photographed object in the first preview image, and the first identifier is text or an icon.

Optionally, after the display unit 1402 is configured to display the first identifier of the first music on the first preview screen, the processing unit 1401 is further configured to receive a second operation.

In response to the second operation, the display unit 1402 is further configured to display a second preview screen including a second preview image, the second preview image is different from the first preview image, and the second preview image includes at least one photographed object. The display unit 1402 is further configured to display a second identifier of second music on the second preview screen, the second music is different from the first music, the second music is music matched by the terminal device based on the at least one photographed object in the second preview image, and the second identifier is text or an icon.

Optionally, the first preview screen includes a first photographing control. The processing unit 1401 is further configured to obtain a first photographed image in response to an operation used to trigger the first photographing control. The first photographed image is an image obtained by the terminal device by synthesizing the first music and the first preview image.

Optionally, the second preview screen includes a second photographing control. The processing unit 1401 is further configured to obtain a second photographed image in response to an operation used to trigger the second photographing control. The second photographed image is an image obtained by the terminal device by synthesizing the second music and the second preview image.

Optionally, the terminal device further includes a sound playing unit, and the sound playing unit is configured to play the first music in response to an operation of triggering the first identifier.

Optionally, a second control is displayed in the preview image, and the second control is configured to trigger displaying a type of music. The display unit 1402 is further configured to display a first list in response to a user's operation of triggering the second control, and the first list includes at least one type of music. The display unit 1402 is further configured to display a first identifier of the first music in response to a user's operation of selecting a first type, and the type of the first music is the first type.

In a specific implementation, the processing unit 1401 may be equivalent to a processor of the terminal device, and the display unit 1402 may be equivalent to a display screen of the terminal device.

The foregoing embodiments describe processing performed by the terminal device on the preview image during photographing. It should be noted that the photographing may be photo photographing, or may be video photographing. In addition, a photographed video image is processed similarly with reference to the foregoing method for processing the preview image. For example, the video image may be processed as follows:

In a video photographing process, the photographed video image may include several frames. Some consecutive frames may be in similar or consecutive scenarios. To be specific, photographed objects in these frames are the same or most of the photographed objects are the same. The terminal device may analyze content of each frame in the photographed video image, and identify text information or music information that matches a photographed object in each frame. Because content that matches each frame may be the same or may be different, there may be a plurality of pieces of text or music that match the entire video image. Alternatively, after identifying the consecutive frames indicating similar or consecutive scenarios, the terminal device may analyze content in these consecutive frames, and identify text information or music information that matches photographed objects in these consecutive frames. A group of consecutive frames corresponds to one piece of text information or music information. Because an entire video image may include a plurality of groups of consecutive frames (scenarios indicated by all frames in one group of consecutive frames are similar or consecutive), and content that matches each group of consecutive frames may be the same or may be different, there may be a plurality of pieces of text or music that matches the entire video image. The terminal device may alternatively identify, based on photographed objects in all image frames or some image frames in the video image, one piece of text information or music information that matches these photographed objects. Therefore, there is one piece of text or music that matches the entire video image. In other words, one piece of text information or music information may match the entire video image, or may match one frame or some frames in the video image.

A method for identifying the text information or the music information that matches each frame, some consecutive frames, or all image frames is the same as the method for identifying the text information or the music information that matches the preview image in the foregoing embodiment.

After the matched text information is identified, the text information may be displayed on a display screen in real time, or matched text information may be displayed on a playing screen when the video is played again and after the video photographing ends.

After the matched music information is identified, the matched music may be played in real time, or matched music may be played at the same time when the video is played again and after the video photographing ends.

When the entire video image corresponds to only one piece of text information or music information, in a process of playing the entire video, same text may be always displayed or same music may be played. When each frame corresponds to different text information or music information, or when some frames correspond to different text information or music information, in a process of playing the entire video, text that matches the current frame needs to be displayed, or music that matches the current frame needs to be played.

The foregoing embodiments describe processing performed by the terminal device during the photo photographing or the video photographing. It should be noted that, in addition to the processing in the photographing process, the embodiments of this application may further include a method for processing a photographed photo or video. The method may include:

S1501: A terminal device obtains first content, where the first content may be a photo or a video.

The terminal device may obtain the first content by photographing the photo or video. The terminal device may further obtain the first content from a cloud or another external device. For example, the terminal device downloads the photo or the video from the cloud, or the terminal device receives the photo or the video sent by another terminal device.

S1502: The terminal device receives a fourth operation. The fourth operation is selecting the first content, and is willing to share the first content. In other words, the fourth operation indicates that a user wants to share the first content. The fourth operation may be one operation, or may include a plurality of operations.

The sharing may be sending to an external terminal, or may be uploading to an external network. To be specific, as long as the first content is sent by using a network, another user can obtain or view the first content. A specific form of the sharing is not limited in this embodiment. For example, the sharing may be that the terminal device sends the first content to another one terminal device or more terminal devices by using instant communications software (for example, WeChat or QQ), or may be that the terminal device sends the first content to a platform of social software (for example, the WeChat or Facebook), so that the another user of the social software can view the first content.

S1503: In response to the fourth operation, the terminal device identifies an object in the first content, where at least one object in the first content matches preset text information or audio.

The terminal device may find, locally or in the network, text information or audio information corresponding to one or more objects in the first content.

S1504: The terminal device generates second content based on the first content and text or audio that matches the first content.

After finding the text or audio that matches the first content, the terminal device may generate the second content based on the matched text or audio. For example, the terminal device may superimpose the matched text on the first content (the photo or video), to form the second content, or the terminal device may superimpose the matched audio information on the first content or associate the matched audio information with the first content. The audio information may include audio data, or may include audio data and text corresponding to the audio data. The second content may include the matched audio information, or the second content may include a download address or a download link of the matched audio information.

S1505: The terminal device shares the second content.

After generating the second content, the terminal device may first present the second content. For example, the terminal device presents the first content on which the matched text is superimposed, or the terminal device presents the first content on which an identifier of the matched audio is superimposed. In other words, a name of the matched audio or an identifier of another graphic may be displayed in the first content on a display screen, so that the user may learn of the matched audio. After the user views the second content presented by the terminal device, the user may choose to share the second content. After the terminal device receives an operation instruction used to instruct the terminal device to share the second content, the terminal device shares the second content with another device. The terminal device may share the second content with the another device by using various existing networks.

S1506: After receiving the second content, the another device presents the second content. Specifically, the another device may display the photo or video including the matched text, or the another device may play the matched audio when displaying the photo or playing the video, and may further display the text corresponding to the audio when the audio is played. For example, when the audio is a song, the text corresponding to the audio may be lyrics of the song.

In this embodiment of this application, the photographed photo or video may be processed, and the matched text or audio is automatically added.

With descriptions of the foregoing embodiments, a person skilled in the art may clearly understand that the embodiments of this application may be implemented by hardware, firmware or a combination thereof. When the embodiments of this application are implemented by software, the foregoing functions may be stored on a computer-readable medium or transmitted as one or more instructions or code in a computer-readable medium. The computer-readable medium includes a computer storage medium and a communications medium, and the communications medium includes any medium that enables a computer program to be transmitted from one place to another. The storage medium may be any available medium accessible to a computer. This is used as an example but is not limited to: The computer-readable medium may include a RAM, a ROM, an electrically erasable programmable read-only memory (EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as the computer-readable medium. For example, if software is transmitted from a website, a server or another remote source by using a coaxial cable, an optical fiber cable, a twisted pair, a digital subscriber line (DSL) or a radio technology such as an infrared ray, radio and microwave, the coaxial cable, the optical fiber cable, the twisted pair, the DSL or the radio technology such as the infrared ray, the radio and the microwave are included in fixation of a medium to which they belong. A disk and disc used by the embodiments of this application include a compact disc (CD), a laser disc, an optical disc, a digital video disc (DVD), a floppy disk and a Blu-ray disc, the disk generally copies data by a magnetic means, and the disc copies data optically by a laser means. The foregoing combination should also be included in the protection scope of the computer-readable medium.

In summary, what is described above is merely embodiments of this application, but is not intended to limit the protection scope of this application. Any modification, equivalent replacement, or improvement made according to the disclosure of this application shall fall within the protection scope of this application.

The invention claimed is:
1. A method, comprising:
receiving, by a terminal device, a first operation;
starting, by the terminal device, a camera in response to the first operation;
displaying, by the terminal device, a first preview screen comprising a first preview image, wherein the first preview image is captured by the camera and comprises a first photographed object;
displaying, by the terminal device, a first identifier of first music on the first preview screen, wherein the first identifier is text or an icon, and the first identifier of the first music is determined by matching at least one first keyword corresponding to the first photographed object with at least one second keyword corresponding to the first music; and
obtaining, by the terminal device, a first multimedia file in response to an operation that triggers a first control, wherein the first multimedia file is obtained by the terminal device by synthesizing the first music and the first preview image.

2. The method according to claim 1, further comprising:
receiving, by the terminal device, a second operation;
in response to the second operation, displaying, by the terminal device, a second preview screen comprising a second preview image, wherein the second preview image is different from the first preview image, and the second preview image comprises a second photographed object; and
displaying, by the terminal device, a second identifier of second music on the second preview screen, wherein the second music is different from the first music, the second music is related to the second photographed object in the second preview image, and the second identifier is text or an icon.

3. The method according to claim 2, wherein the second preview screen comprises a second control, and the method further comprises:
obtaining, by the terminal device, a second multimedia file in response to an operation used to trigger the first control, wherein the second multimedia file is obtained by the terminal device by synthesizing the second music and the second preview image.

4. The method according to claim 1, further comprising:
playing, by the terminal device, the first music in response to an operation of triggering the first identifier.

5. The method according to claim 1, wherein a music control is displayed in the first preview image, the music control is configured to trigger displaying a type of music, and the method further comprises:
displaying, by the terminal device, a first list in response to a user's operation of triggering the music control, wherein the first list comprises at least one type of music; and
displaying, by the terminal device, the first identifier of the first music in response to a user's operation of selecting a first type, wherein a type of the first music is the first type.

6. The method according to claim 1, wherein the first music is stored on a server and is sent to the terminal device by the server.

7. The method according to claim 6, further comprising:
sending, by the terminal device, the first preview image to the server; and
receiving, by the terminal device, information related to the first music from the server.

8. The method according to claim 6, further comprising:
recognizing, by the terminal device, the first photographed object;
sending, by the terminal device, the at least one first keyword related to the first photographed object to the server; and
receiving, by the terminal device, information related to the first music from the server.

9. The method according to claim 1, wherein the first music is a music segment.

10. The method according to claim 1, wherein the icon is a musical note.

11. The method according to claim 1, wherein the first photographed object comprises one of an animal, food, a flower, a green plant, a mountain, a river, a stage, a beach, a waterfall, a night scene, a blue sky, or a snow scene.

12. A terminal device, comprising a memory and a processor, wherein the memory is configured to store a computer program, and the processor is configured to execute the computer program to perform the following:
receive a first operation;
start a camera in response to the first operation;
display a first preview screen comprising a first preview image, wherein the first preview image is captured by the camera and comprises a first photographed object;
display a first identifier of first music on the first preview screen, wherein the first identifier is text or an icon, and the first identifier of the first music is determined by matching at least one first keyword corresponding to the first photographed object with at least one second keyword corresponding to the first music; and
obtain a first multimedia file in response to an operation that triggers a first control, wherein the first multimedia file is obtained by the terminal device by synthesizing the first music and the first preview image.

13. The terminal device according to claim 12, wherein the processor is configured to further execute the computer program to perform the following:
play the first music in response to an operation of triggering the first identifier.

14. The terminal device according to claim 12, wherein a music control is displayed in the first preview image, the music control is configured to trigger displaying a type of music and the processor is configured to further execute the computer program to perform the following:
display a first list in response to a user's operation of triggering the music control, wherein the first list comprises at least one type of music; and
display the first identifier of the first music in response to a user's operation of selecting a first type, wherein a type of the first music is the first type.

15. The terminal device according to claim 12, wherein the first music is stored on a server and is sent to the terminal device by the server.

16. The terminal device according to claim 12, wherein the first music is a music segment.

17. A non-transitory computer-readable storage medium, wherein the computer-readable storage medium stores a computer program, and when the computer program runs on a terminal device, the terminal device is enabled to perform the following:
receive a first operation;
start a camera in response to the first operation;
display a first preview screen comprising a first preview image, wherein the first preview image is captured by the camera and comprises a first photographed object;
display a first identifier of first music on the first preview screen, wherein the first identifier is text or an icon, and the first identifier of the first music is determined by matching at least one first keyword corresponding to the first photographed object with at least one second keyword corresponding to the first music; and
obtain a first multimedia file in response to an operation that triggers a first control, wherein the first multimedia file is obtained by the terminal device by synthesizing the first music and the first preview image.

\* \* \* \* \*